(12) United States Patent
Oikawa

(10) Patent No.: US 7,483,072 B2
(45) Date of Patent: *Jan. 27, 2009

(54) IMAGE-TAKING APPARATUS AND IMAGE-TAKING SYSTEM

(75) Inventor: Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 604 days.

This patent is subject to a terminal disclaimer.

(21) Appl. No.: 11/093,779

(22) Filed: Mar. 30, 2005

(65) Prior Publication Data

US 2005/0219401 A1 Oct. 6, 2005

(30) Foreign Application Priority Data

Mar. 31, 2004 (JP) ............................. 2004-108512

(51) Int. Cl.
*H04N 5/232* (2006.01)
*H04N 5/222* (2006.01)

(52) U.S. Cl. ................................. 348/345; 348/333.09

(58) Field of Classification Search ................. 348/335, 348/360, 333.06, 333.09, 345–350
See application file for complete search history.

(56) References Cited

U.S. PATENT DOCUMENTS 7,224,395 B2 * 5/2007 Kato et al. .................. 348/341

FOREIGN PATENT DOCUMENTS

| JP | 06-082908 | 3/1994 |
|----|-----------|--------|
| JP | 08-234273 | 9/1996 |
| JP | 2000-162494 A | 6/2000 |
| JP | 2001-125173 | 5/2001 |
| JP | 2001-275033 | 10/2001 |

* cited by examiner

*Primary Examiner*—Lin Ye
*Assistant Examiner*—Trung Diep
(74) *Attorney, Agent, or Firm*—Cowan, Liebowitz & Latman, P.C.

(57) ABSTRACT

An image-taking apparatus is disclosed, which is capable of blocking inversely-entering light from an optical viewfinder in an EVF mode. The image-taking apparatus comprises a viewfinder optical system; a mirror unit being driven between a first state in which the mirror unit reflects the light flux toward the viewfinder optical system and a second state in which the mirror unit transmits the light flux toward the image-pickup device; a viewfinder shutter opening and closing a viewfinder optical path; and a controller controlling the drive of the mirror unit. The controller drives the mirror unit to the first state in accordance with an open-side-operation of the operation member, and drives the mirror unit to the second state in accordance with a close-side-operation of the operation member.

7 Claims, 12 Drawing Sheets

IMAGE-TAKING APPARATUS AND IMAGE-TAKING SYSTEM

BACKGROUND OF THE INVENTION

The present invention relates to an image-taking apparatus, and more particularly to an image-taking apparatus that enables a user to arbitrarily switch a viewfinder mode by operating a mirror unit.

A single lens reflex camera as one image-taking apparatus reflects the light emitted from an image-taking lens via a mirror closer to an image surface than the image-taking lens, and introduces the light to the optical viewfinder ("OVF"). Thereby, a photographer can view an erect object image formed by the shooting lens. The mirror is obliquely provided on a shooting optical path.

In shooting an object image, the mirror retreats from the shooting optical path, and enables the light from the image-taking lens to such an imaging medium as a film and an image-pickup device, such as a CCD. After the shot, the mirror is obliquely arranged on the shooting optical path.

Some digital single lens reflex cameras can select two types of focusing, i.e., a manual phase difference detection and a contrast detection (Japanese Patent Application, Publication No. 2001-275033). The phase difference detection determines focus when the mirror is obliquely provided on the shooting optical path, and the contrast detection determines focus using an output from the image-pickup device, when the mirror retreats from the image-taking optical path (Japanese Patent Application, Publication No. 2001-125173). A camera of Japanese Patent Application, Publication No. 2001-125173 electronically displays an image read from the image-pickup device on an electronic viewfinder ("EVF"), determines focus by the contrast detection, and measures the subject brightness using an output from the image-pickup device.

In general, the contrast detection seeks a position having a maximum AF evaluation value by slightly moving the image-taking lens in the optical axis direction, and disadvantageously requiring a long time to determine focus. On the other hand, the phase difference detection moves the image-taking lens by a detected defocus amount, and needs a shorter time to determine focus than the contrast detection.

Therefore, it is possible to construct the camera as follows for performing high-speed focus detection by the phase difference detection method in a case where the object image is observed with electric display.

The camera includes a main mirror whose whole portion is half-mirror and a sub-mirror which reflects light that has been transmitted through the main mirror, the main mirror and sub-mirror moving independently. The positions of the main mirror and sub-mirror are changed between the EVF state and the OVF state. Specifically, in the OVF state, the light flux that has come from the image-taking lens and reflected by the main mirror is led to the optical viewfinder, and the light flux that has been transmitted through the main mirror is reflected by the sub mirror and led to the focus detection unit. In the EVF state, the sub mirror is retreated from the image-taking optical path, the position of the main mirror is changed to reflect the light flux from the image-taking lens for leading it to the focus detection unit, and the light flux that has been transmitted through the main mirror is led to the image-pickup device.

The above-described structure makes it possible to perform focus detection of the focus detection unit by the phase difference detection method and high-speed focusing in the OVF and EVF states.

In the above-mentioned camera, since the photographer does not see into the optical viewfinder, outside light may enter the camera through the eyepiece of the viewfinder and reach the focus detection unit and image-pickup device. The light entered from the eyepiece (hereinafter, it is referred to as inversely-entering light) will become ghost light because it is not used for image-taking. Therefore, focus detection errors will occur when the inversely-entering light reaches the focus detection unit, and deterioration of the electrically-displayed image will occur when the inversely-entering light reaches the image-pickup device.

On the other hand, when the image-taking operation is performed from the OVF state or EVF state, since the main mirror and sub mirror are retreated from the image-taking optical path, the light flux from the image-taking lens reaches the image-pickup device directly. The arrival of the inversely-entering light in the image-pickup device during the image-taking operation deteriorates taken images.

It is possible to close an eyepiece shutter provided in the optical viewfinder to prevent the inversely-entering light from entering in the EVF mode and during an image-taking operation.

A camera has been proposed, in which the eyepiece shutter is closed with a mirror-up operation at the time of image-taking (see Japanese Patent Application, Publication No. H06-82908). The camera has a planetary mechanism that transmits driving power to the driving mechanism of the mirror and driving mechanism of the eyepiece shutter; the planetary mechanism drives the driving mechanism of the eyepiece shutter by its orbital motion.

Moreover, a camera has been proposed, in which the opening and shutting operation of the eyepiece shutter is controlled based on a detection result of photographer's viewing of the optical viewfinder (see Japanese Patent Application, Publication No. H08-234273). The camera has a viewing detection means that detects whether the eye of the photographer approaches the eyepiece of the optical viewfinder or not; the eyepiece shutter is closed when the eye of the photographer does not approach the eyepiece.

However, the camera proposed in Japanese Patent Application, Publication No. H06-82908 needs the mechanism that transmits driving power to the driving mechanism of the mirror and driving mechanism of the eyepiece shutter for preventing entrance of the inversely-entering light. Normally, the driving mechanism of the mirror and the driving mechanism of the eyepiece shutter are arranged separately because the driving mechanism of the mirror is arranged beside the mirror and the driving mechanism of the eyepiece shutter is arranged in the optical viewfinder. Therefore, the mechanism that transmits driving power to the two mechanisms becomes large and complicated.

Moreover, in the camera proposed in Japanese Patent Application, Publication No. H06-82908, the eyepiece shutter is not closed in the EVF state though it is closed with the image-taking operation. Therefore, to close the eyepiece shutter in the EVF mode, another driving mechanism or operation member that is operated by the photographer to drive the eyepiece shutter is needed.

However, providing the other driving mechanism increases in size of the camera and complicates the structure thereof because the other mechanism is added to the existing mechanisms.

Furthermore, in the case where the above-mentioned operation member is provided to the camera, the photographer must operate the operation member for each change between the OVF state and the EVF state; it bothers the photographer. In addition, since the photographer possibly forgets to operate the operation member in the EVF state, the eyepiece shutter does not always block the inversely-entering light. Moreover, opening the eyepiece shutter in the EVF state does not reflect the photographer's intention to close the eyepiece shutter when the optical viewfinder is not used.

On the other hand, in a case where the mechanism proposed in Japanese Patent Application, Publication No. H08-234273 is adopted for blocking the inversely-entering light in the EVF state, there is a problem that the eyepiece shutter is not closed when an image-taking operation is done from the OVF state. Specifically, in the case where the eyepiece shutter is not closed when the photographer takes an image while seeing into the optical viewfinder, the inversely-entering light may enter the camera from the eyepiece. In this case, the inversely-entering light reaches the image-pickup device, deteriorating the taken image.

BRIEF SUMMARY OF THE INVENTION

Accordingly, it is an exemplary object of the present invention to provide an image-taking apparatus capable of blocking inversely-entering light from an optical viewfinder in an EVF mode without fail by interlocking the operation of a viewfinder shutter and the change of viewfinder modes.

An image-taking apparatus according to one aspect of the present invention includes an image-pickup device, which performs photoelectrical conversion of an object image formed with a light flux from an image-taking lens; a viewfinder optical system, which is used for optical observation of the object image with the light flux; and a mirror unit, which is driven between a first state in which the mirror unit reflects the light flux toward the viewfinder optical system and a second state in which the mirror unit transmits the light flux toward the image-pickup device. The image-taking apparatus further comprises a viewfinder shutter, which opens and closes a viewfinder optical path of the viewfinder optical system; an operation member, which is operated to make the viewfinder shutter open and close; and a controller, which controls the drive of the mirror unit. The controller drives the mirror unit to the first state in accordance with an open-side-operation of the operation member, and drives the mirror unit to the second state in accordance with a close-side-operation of the operation member.

Other objects and further features of the present invention will become readily apparent from the following description of the preferred embodiments with reference to the accompanying drawings.

DETAILED DESCRIPTION OF THE PREFERRED EMBODIMENTS

Referring now to the accompanying drawings, a description will be given of the preferred embodiment.

Figure 4:
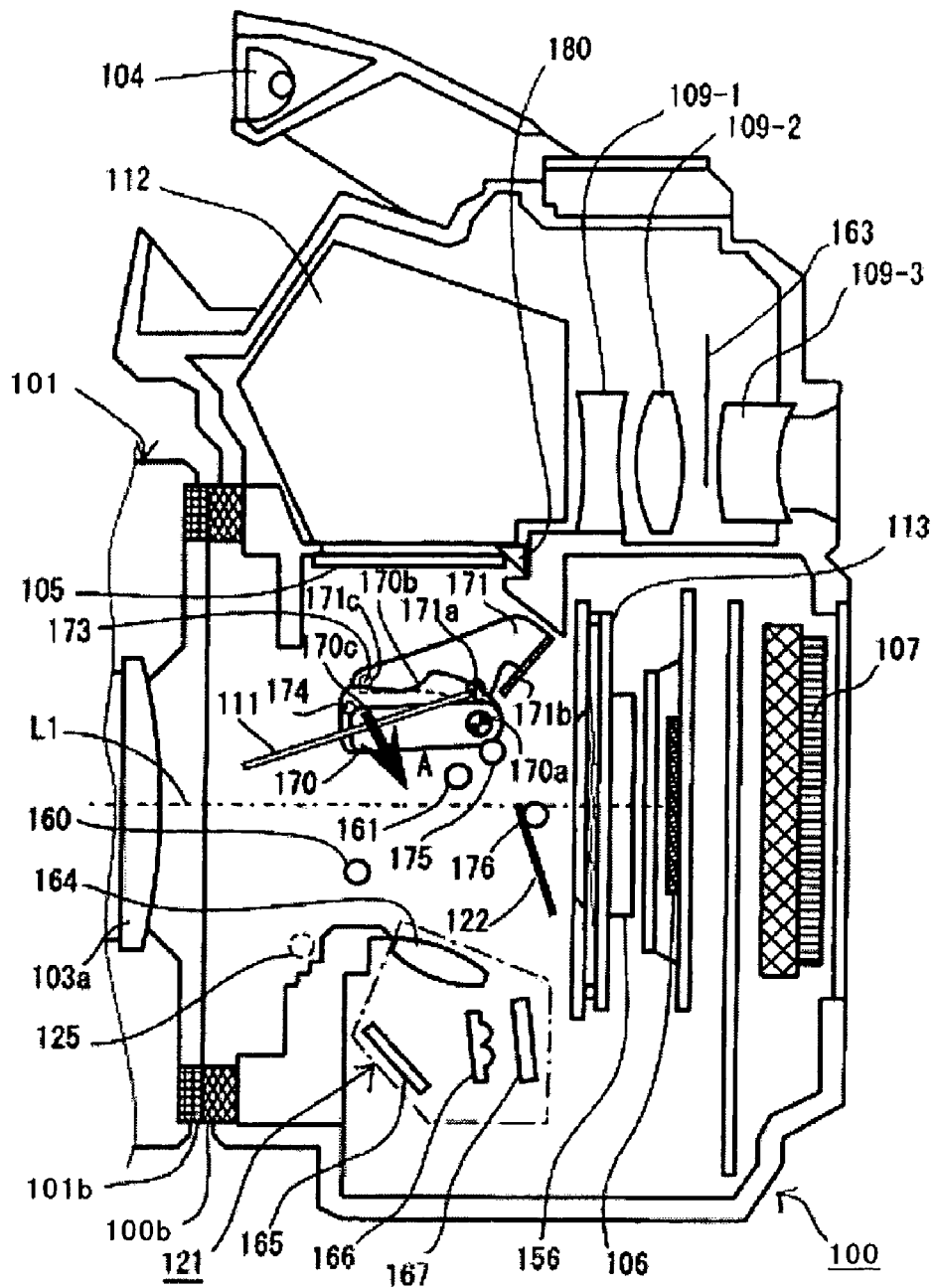
FIG. 4 is a sectional view of the camera system of one embodiment, which is switching from a first optical path splitting state to a third optical path splitting state.
Figure 5:
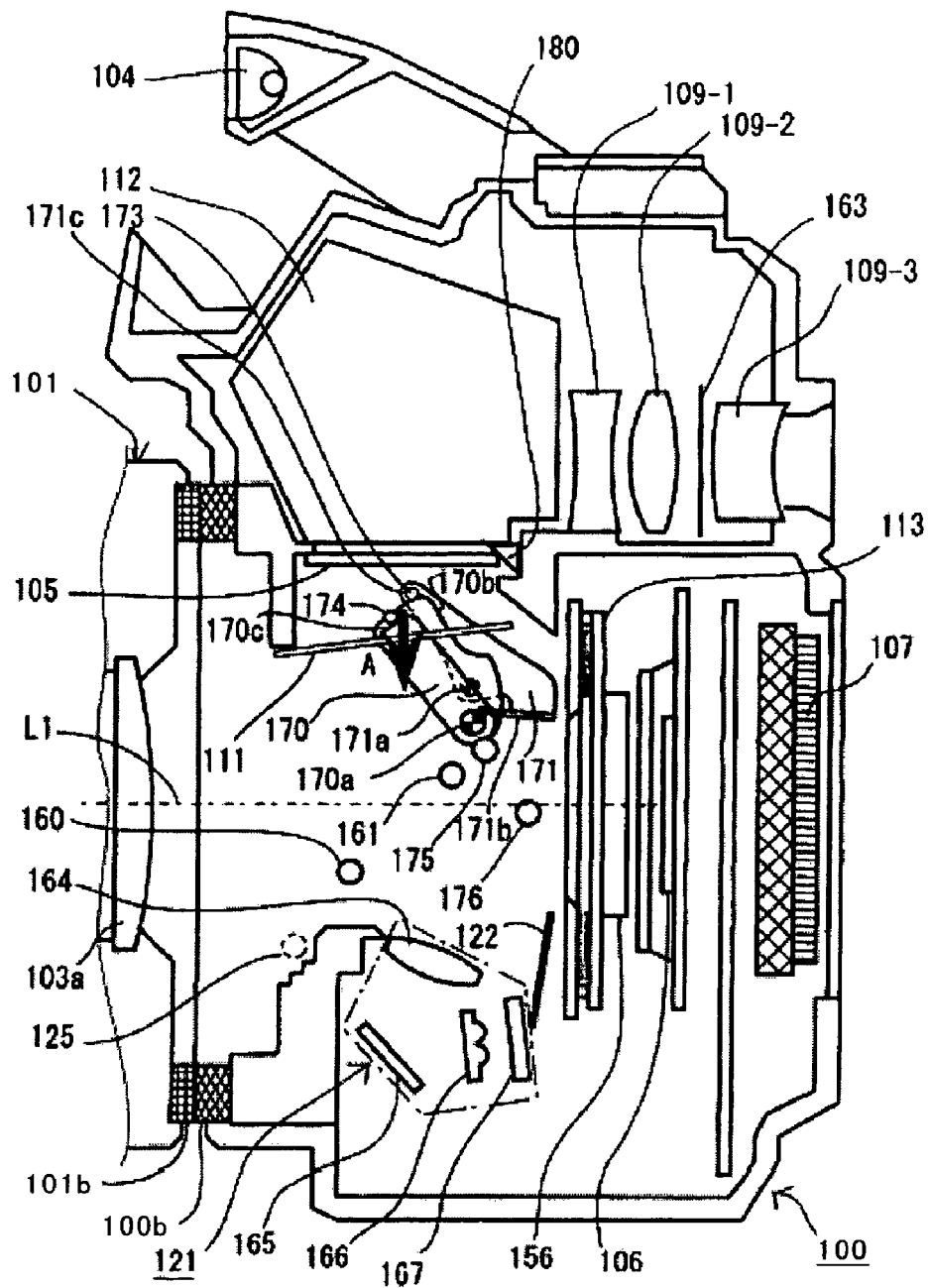
FIG. 5 is a sectional view of the camera system of one embodiment in the third optical path splitting state.
Figure 6:
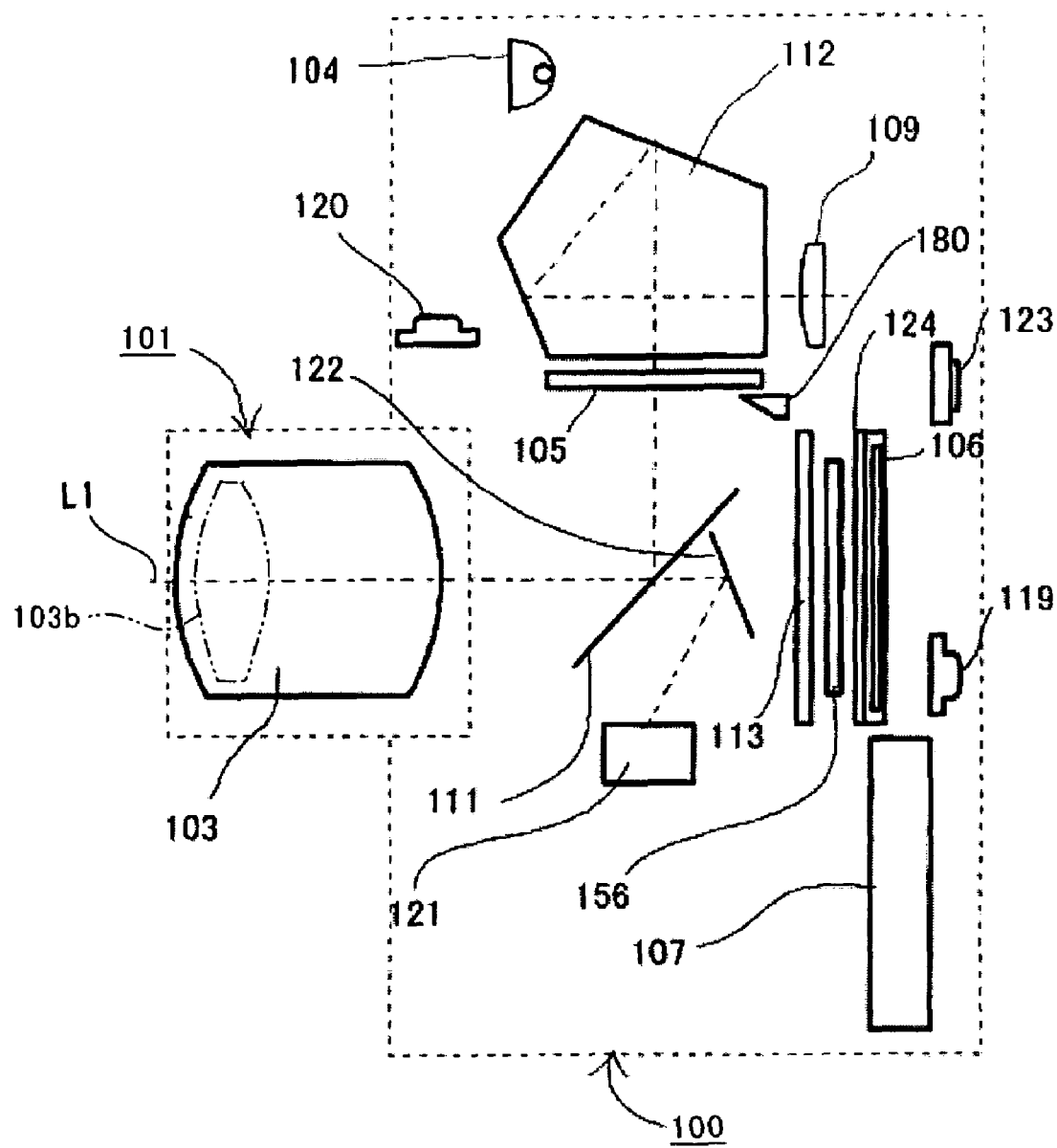
FIG. 6 is a schematic view of an optical configuration of the camera system according to one embodiment.

FIGS. 1 to 7 show a camera (or image-taking) system according to one embodiment of the present invention. FIG. 6 shows a schematic optical structure of the camera system of this embodiment. This camera system includes a camera body (or an image-taking apparatus) and a lens unit that is detachably attached to the camera body.

The camera is a one-CCD digital color camera that uses an image-pickup device, such as a CCD and a CMOS sensor, drives the image-pickup device continuously or for each shot, and obtains an image signal indicative of a motion or still image. The image-pickup device is an area sensor that converts the exposure light into an electric signal for each pixel, and stores and reads electric charges corresponding to the received light intensity.

In FIG. 6, 100 denotes a camera body, and 101 denotes a lens unit that is detachable from the camera body 100. The lens unit 101 includes a stop 102 and an image-taking optical system 103. The lens unit 101 is electrically and mechanically connected to the camera body 100 via a known mounting mechanism. Image-taking screens with various angles of field are available by connecting the lens units 101 having different focal lengths to the camera body 100.

In focusing an image-taking optical system, the lens unit 101 moves a focus lens 103$b$ in an image-taking optical system 103 along an optical axis L1 via a driving mechanism (not shown), or makes the focus lens 103$b$ of an flexible or elastic transparent element or liquid lens and varies an interface shape and thus a refractive power.

106 denotes an image-pickup device housed in a package 124. On an optical path from the image-taking optical system 103 to the image-pickup device 106, an optical low-pass filter 156 is provided which restricts a cutoff frequency of the image-taking optical system 103 and prevents excessively high space frequency component of the object image (or optical image) from transmitting to the image-pickup device 106. The image-taking optical system 103 has an infrared ray (IR) cut filter (not shown).

A signal read from the image-pickup device 106 is displayed as image data on a display unit 107 after processed as follows. The display unit 107 is attached to a back surface of the camera body 100, and a user can directly observe a display on the display unit 107.

The display unit 107 that includes an organic EL spatial modulator, a liquid crystal spatial modulator, and a spatial modulator that utilizes electrophoresis of fine particles saves the consumption power and becomes thin, making the camera body 1 energy-efficient and small.

Specifically, the image-pickup device 106 is a CMOS process compatible sensor (simply "CMOS sensor" hereinafter) as one amplification CCD. One characteristic of the CMOS sensor is that a single process can form the MOS transistor and peripherals in the area sensor such as an image-pickup device driver, an AD converter and an image processor, remarkably reducing the number of masks and the processing step in comparison with the CCD. Another characteristic is a random access to an arbitrary pixel, which facilitates readout of a cut image for display, and provides real-time displays at a high display rate on the display unit 107.

The image-pickup device 106 uses the above characteristics to output images to be displayed (partially cut readouts of the light receiving area on the image-pickup device 106) and to output fine images (full readouts of the light receiving area).

111 denotes a movable half mirror (a first mirror member) for reflecting part of the light from the image-taking optical system 103, and for transmitting the rest of the light. The half mirror 111 has a refractive index of about 1.5 and a thickness of 0.5 mm. 105 denotes a focusing screen arranged on an expected imaging surface of the object image formed by the image-taking optical system 103. 112 denotes a pentaprism.

Figure 1:
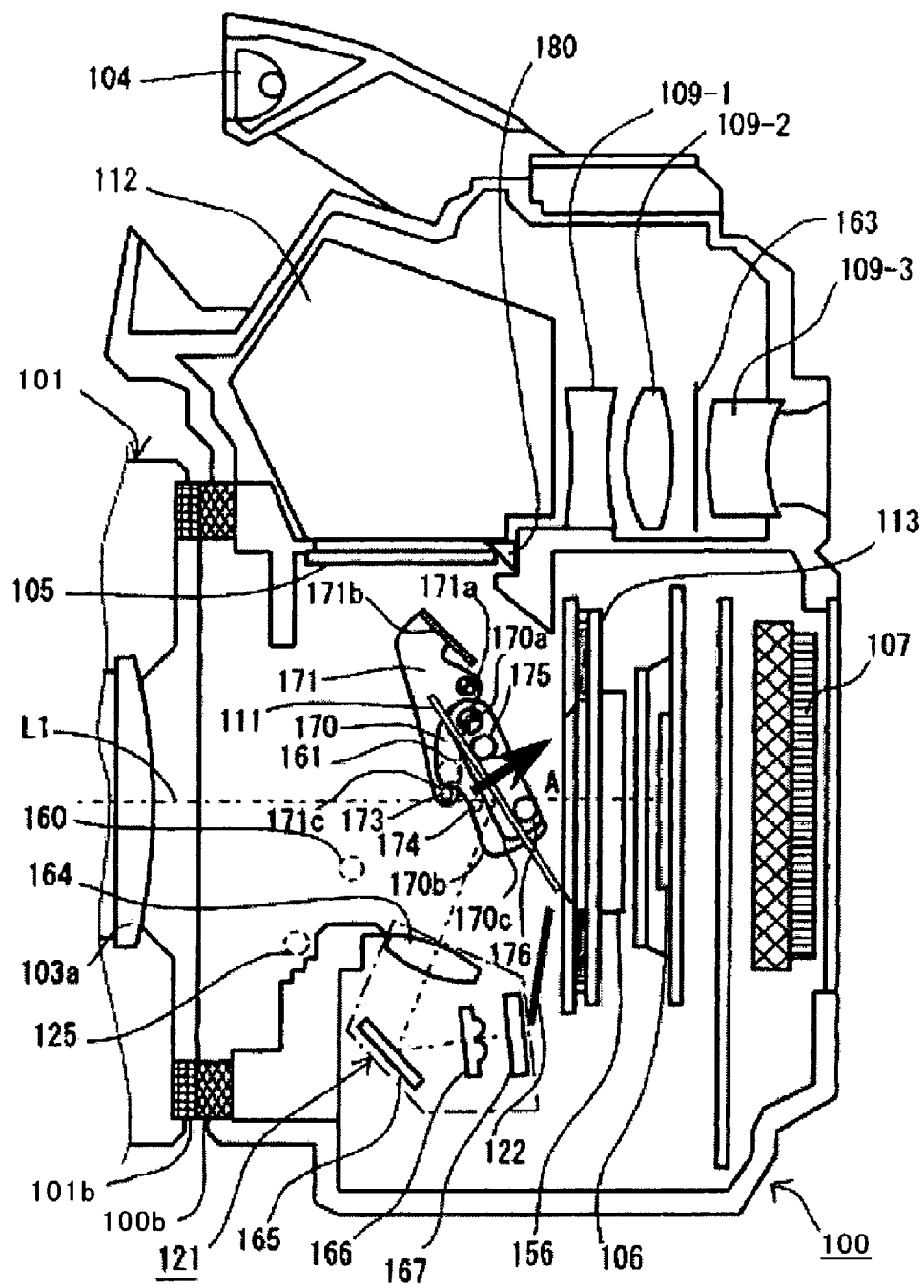
FIG. 1 is a sectional view of a camera system at a second optical path splitting state according to one embodiment of the present invention.

109 denotes a viewfinder lens that observes an object image formed on the focusing screen, and actually includes three viewfinder lenses 109-1, 109-2 and 109-3 in FIG. 1. The focusing screen 105, the pentaprism 112 and the viewfinder lens 109 constitute a viewfinder optical system.

A movable sub-mirror (or a second mirror member) 122 is provided behind the half mirror 111 (at the image surface side), which reflects and introduces to the focus detecting unit 121 the light that has transmitted through the half mirror 111 and close to the optical axis L1. The sub-mirror 122 rotates around a rotating axis 125 (see FIG. 1 etc.), which will be described later, and is housed in the lower portion of the mirror box in accordance with an action of the half mirror 111. The sub-mirror 122 is not operably integrated with the half mirror, and independently projects to and retreats from the image-taking optical path.

The focus detecting unit 121 receives the light from the sub-mirror 122, and determines focus by the phase difference detection.

An optical path splitting system that includes the half mirror 111 and the sub-mirror 122 is adapted to switch among first to third optical path splitting states, as described later. In the first optical path splitting state (or a first state), the light from the image-taking optical system 103 is reflected on the half mirror 111 and introduced to the viewfinder optical system, while the light that has transmitted through the half mirror 111 is reflected on the sub-mirror 122 and introduced to the focus detecting unit 121.

The first optical path splitting state enables the object image formed by the above light to be observed via the viewfinder lens 109, and the focus detecting unit 121 to detect focus. FIG. 6 shows the first optical path splitting state.

In the second optical path splitting state, the light from the image-taking optical system 103 transmits through the half mirror 111, reaches the image-pickup device 106 through the half mirror 111, and is reflected on the half mirror 111 and introduced to the focus detecting unit 121. The second optical path splitting state enables the captured image data to be displayed on the real-time basis on the display unit 107, and provides high-speed continuous image-taking. Since the second optical path splitting state does not drive the optical path splitting system in image-taking by the image-pickup device 106, the high-speed continuous image-taking is available by accelerating operations in the signal processing system.

The second optical path splitting state enables the focus detecting unit 121 to determine focus. Therefore, during monitoring on the display unit 107, the high-speed focusing is available by the phase difference detection.

Since the light from the image-taking optical system 103 reaches the image-pickup device 106 in the second optical path splitting state, the contrast detection that uses an output from the image-pickup device 106 may determine focus, in addition to the above focusing by the phase difference detection, for more highly precise focusing.

The third optical path splitting state directly introduces the light from the image-taking optical system 103 to the image-pickup device 106, and retreats the half mirror 111 and sub-mirror 122 from the image-taking optical path. The third optical path splitting state is used to generate a fine image suitable for large printing etc.

A mirror driving mechanism having an electromagnetic motor and gears (not shown) switches the optical path splitting system among the first to third optical path splitting states by displacing the half mirror 111 and the sub-mirror 122, respectively. A camera system controller 135 controls driving of the mirror driving mechanism via a mirror driving controller 145 as described later.

The half mirror 111 is made of lightweight transparent resin for quickly switching among the above three optical path splitting states. A birefringent polymer thin coating is pasted on the back surface of the half mirror 111 (or a surface on the side of sub-mirror 122 in FIG. 6). This provides a strong low-pass effect when the shot does not use all the pixels of the image-pickup device 106, for example, for image monitoring (with a real-time display) and high-speed continuous image-taking.

A fine pyramid periodic structure having a pitch smaller than a wavelength of the visible light on the surface of the half mirror 111 may provide a so-called photonic crystal effect to reduce the surface reflection caused by the refractive index difference between the air and resin and to improve light use efficiency. This structure prevents the ghost due to multi-reflections on the front and back surfaces of the half mirror 111.

104 denotes a movable flashing unit that is movable between an accommodated position at which the unit is housed in the camera body 100 and an emission position at which the unit projects from the camera body 100. 113 denotes a focal plane shutter that adjusts the light intensity incident upon the image surface. 119 denotes a main switch that activates the camera body 100.

120 denotes a two-stage pressing release button. The half-press (SW1 ON) starts an image-taking preparation, such as photometry and focusing, and the full-press (SW2 ON) starts image-taking (or storing image data read from the image-pickup device 106 in the recording medium).

123 denotes an eyepiece shutter switch (operation member). Operating the eyepiece shutter switch 123 can make an eyepiece shutter, described later, move into and move out of the optical path of the viewfinder optical system. The eyepiece shutter switch 123 is a slide switch movable between an open-side position for opening the eyepiece shutter (for moving out of the optical path) and a close-side position for closing it (for moving into the optical path). The eyepiece shutter switch 123 is held at these positions after operating thereto.

180 denotes an information display unit in the OVF, and displays specific information on the focusing screen 105.

Figure 7:
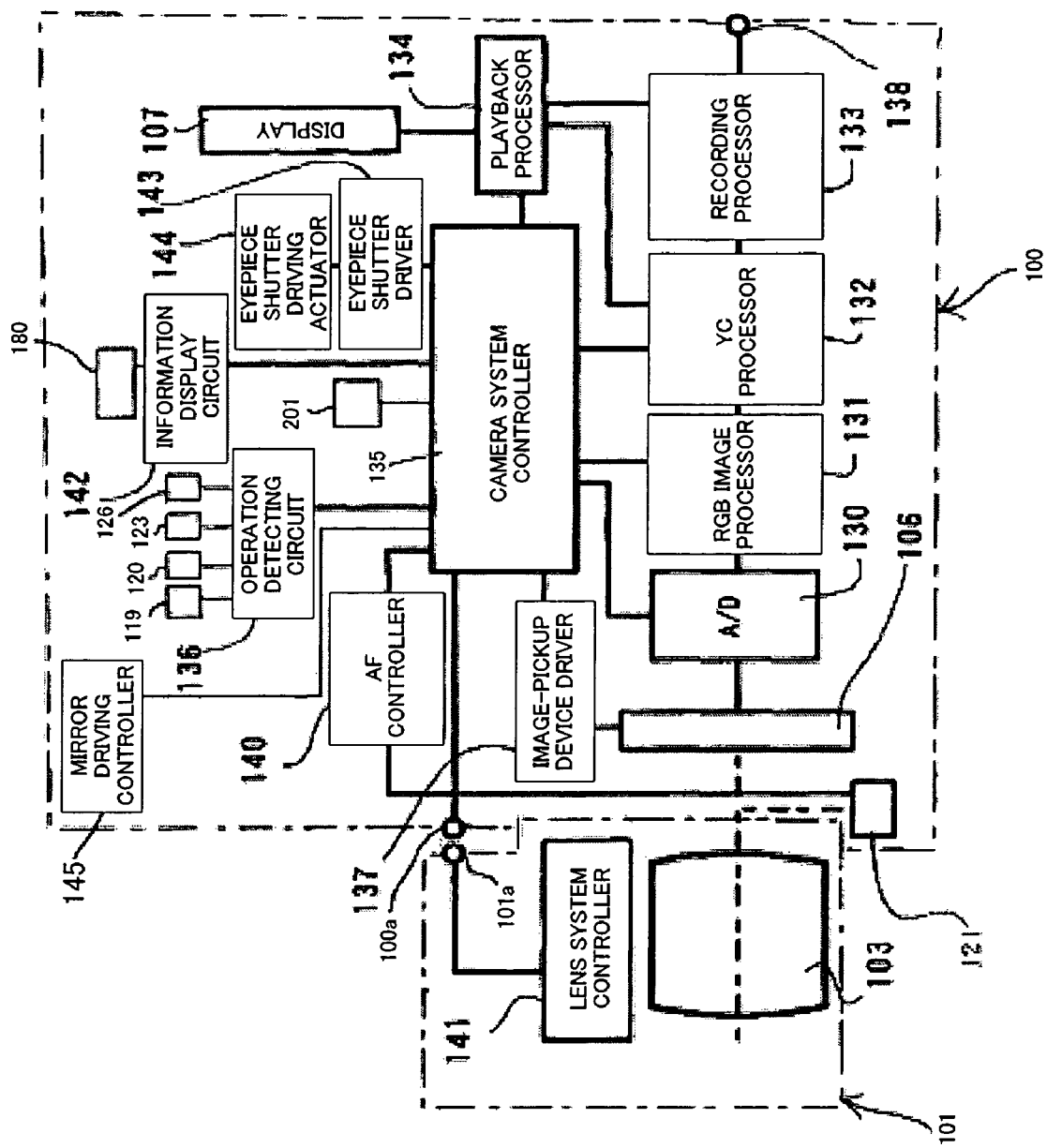
FIG. 7 is a block diagram showing an electric configuration of the camera system according to one embodiment.

FIG. 7 is a block diagram showing an electric configuration of a camera system in this embodiment. Here, those elements described with reference to FIG. 6 are designated by the same reference numerals. A description starts with the image-taking and recording of an object image.

The camera system includes an image-pickup system, an image processing system, a recording/playback system, and a control system. The image-pickup system includes the image-taking optical system 103 and image-pickup device 106. The image processing system includes an A/D converter 130, a RGB image processor 131, and a YC image processor 132. The recording/playback system includes a recording processor 133 and a playback processor 134. The control system includes a camera system controller 135 that serves as a controller of the camera system, an operation detecting circuit 136, an image-pickup device driver 137 and an eyepiece shutter driver 143.

138 denotes a standardized connection terminal connectable to an external computer etc. for data communications. The above electric circuit drives in response to power supply from a small fuel battery (not shown).

The image-pickup system is an optical processing system that images the light from the object onto the image-pickup surface of the image-pickup device 106 via the image-taking optical system 103. Control over a shutter (not shown) in the image-taking optical system 103 and necessary driving of the focal plane shutter 113 will allow the image-pickup device 106 to receive the object light at proper light intensity.

The image-pickup device 106 uses an image-pickup device having totally about 10 million pixels with 3,700 square pixels in a longitudinal direction and 2,800 square pixels in a lateral direction. R (red), G (green) and B (blue) color filters are alternately arranged on respective pixels to form a so-called Bayer arrangement having plural sets of four pixels.

The Bayer arrangement improves collective image performance by arranging more G pixels which an observer feels more strongly in viewing an image than R and B pixels. In general, image processing using this type of image-pickup device generates a brightness signal mainly from G and a color signal from RGB.

A signal read from the image-pickup device 106 is supplied to an image processing system via the A/D converter 130, and the image processing system generates image data through image processing.

The A/D converter 130 is a signal converter that converts, in accordance with the amplitude of a signal read from each pixel of the image-pickup device 106, an output signal from the image-pickup device 106 into, for example, a 10-bit digital signal and outputs the signal. As a result, the subsequent image processing is executed digitally.

The image processing system is a signal processor to obtain an image signal of a desired format from the RGB digital signals, and converts the RGB color signals into a YC signal that is expressed by a brightness signal Y and a color-difference signal (R-Y) and (B-Y), or another signal.

The RGB image processor 131 is a signal processor that processes an output signal from the A/D converter 130, and includes a white balance circuit, a γ-correction circuit, and an interpolation operator that provide high resolution using the interpolation operation.

The YC processor 132 is a signal processor that generates the brightness signal Y and color-difference signals R-Y and B-Y. This YC processor 132 includes a high-range brightness signal generator for a high-range brightness signal YH, a low-range brightness signal for a low-range brightness signal YL, and a color-difference generator that generates the color-difference signals R-Y and B-Y. The brightness signal Y is formed by synthesizing the high-range and low-range brightness signals YH and YL.

The recording/playback system is a processing system that outputs an image signal to a memory (not shown) and an image signal to the display unit 107. The recording processor 133 writes down the image signal in and reads out the image signal from the memory, and the playback processor 134 reproduces the image signal read from the memory, and outputs it to the display unit 107.

The recording processor 133 includes a compression/decompression circuit that compresses the YC signal indicative of the still and motion-picture image data in a predetermined compression format, and decompresses the compressed data. The compression/decompression circuit includes a frame memory etc. for signal processing, and stores the YC signal from the image processing system in this frame memory, reads, compresses and encodes a stored signal from each of plural blocks. The compression and encoding may, for example, use a two-dimensional orthogonal conversion, normalization and Huffman coding of the image signal for each block.

The playback processor 134 is a circuit that matrix-converts the brightness signal Y and color-difference signals R-Y and B-Y, for example, into the RGB signal. A signal converted by the playback processor 134 is output to the display unit 107, and displayed or reproduced as a visual image. The playback processor 134 and the display unit 107 may be connected via a wireless communication means, such as Bluetooth, and this configuration enables the image shot by this camera to be monitored at a remote location.

The operation detecting circuit 136 in the control system detects operations of a main switch 119, a release button 120, the eyepiece shutter switch 123, an image-taking mode setting switch (mode setting member) 126, and other switches (although the other switches are not shown), and outputs the detection result to the camera system controller 135.

The image-taking mode setting switch 126 is a switch operated for selecting and setting one of image-taking modes selectable in the camera. The image-taking modes include, for instance, a shutter-speed priority image-taking mode, aperture-value priority image-taking mode, remote image-taking mode and self-timer image-taking mode.

The camera system controller 135 receives the detection signal from the operation detecting circuit 136, and operates in accordance with the detection result. The camera system controller 135 generates a timing signal for image-taking and outputs it to the image-pickup device driver 137.

The image-pickup device driver 137 generates a driving signal used to drive the image-pickup device 106 in response to a control signal from the camera system controller 135. The information display circuit 142 receives a control signal from the camera system controller 135, and controls driving of the OVF information display unit 180. The eyepiece shutter driver 143 controls the drive of an eyepiece shutter driving actuator 144 according to a control signal from the camera system controller 135.

The control system controls driving of the image-pickup system, image processing system and recording/playback system in response to operations of various switches of the camera body 100. For example, when a press of the release button 120 turns on SW2, the control system (or the camera system controller 135) controls driving of the image-pickup device 106, operations of the RGB image processor 131, and compression of the recording processor 133. In addition, the control system controls driving of the OVF information display unit 180 via the information display circuit 142, and changes a display (or a state of the displayed segment) in the OVF.

The mirror driving controller 145 receives a control signal from the camera system controller 135, and controls driving of the mirror motor (not shown in the figure) as a driving source of the half mirror 111 and the sub-mirror 122 (which are not shown in FIG. 7). The driving force of the mirror motor is transmitted to a mirror driving mechanism (not shown in the figure), and the half mirror 111 and sub-mirror 122 can switch among the first to third optical path splitting states as described above.

A description will now be given of focusing of the image-taking optical system 103.

The camera system controller 135 is connected to an AF controller 140. The camera system controller 135 is connected to a lens system controller 141 in the lens unit 101 via mount contacts 100a and 101a when the lens unit 101 is attached to the camera body 100. The camera system controller 135 transmits necessary for specific processing to and receives the data from AF controller 140 and the lens system controller 141.

The focus detecting unit 121 (or focus detecting sensor 167) outputs to the AF controller 140 a detection signal from a focus detection area that is provided in place on an image-taking screen. The AF controller 140 generates a focus detecting signal based on an output signal from the focus detecting unit 121, and detects a focus state (or a defocus amount) of the image-taking optical system 103. The AF controller 140 converts the detected defocus amount into a driving amount of the focus lens 103b, and sends the information on the driving amount of the focus lens 103b to the lens system controller 141 via the camera system controller 135.

In focusing the moving object, the AF controller 140 predicts a proper stop position of the focus lens 103b by considering the time lag from the full press of the release button 120 to an actual start of the image-taking control. The information on the driving amount of the focus lens 103b to the predicted stop position is sent to the lens system controller 141.

When the camera system controller 135 determines that the brightness of the object is too low to obtain the sufficient focus detecting accuracy based on the output signal of the image-pickup device 106, the flashing unit 104 or the white LED or fluorescent tube (not shown) of the camera body 100 is driven to illuminate the object.

When the lens system controller 141 receives the information on the driving amount of the focus lens from the camera system controller 135, the lens system controller 141 drives a driving mechanism (not shown) in the lens unit 101 and moves the focus lens 103b along the optical axis L1 by the above-described driving amount. Thereby, the image-taking optical system 103 is at the in-focus state. As described above, if the focus lens includes a liquid lens etc., the interface shape will be changed.

When the lens system controller 141 receives information on an exposure (or aperture) value from the camera system controller 135, the lens system controller 141 controls driving of the stop driving actuator (not shown) in the lens unit 101 and operates the stop 102 so that it has an aperture diameter corresponding to the above aperture value, thereby directing the object light at the proper light intensity to the image surface side.

When the AF controller 140 detects focus on the object, the detection result is sent to the camera system controller 135.

When the full press of the release button 120 turns on SW2, the image-taking follows through the image-pickup system, image processing system and recording/playback system as described above.

201 denotes an eyepiece shutter detector, which detects the open state and close state of the eyepiece shutter.

FIGS. 1 to 5 are sectional views of the camera system of this embodiment, and show part of the lens unit 101. Those elements described with reference to FIG. 6 are designated by the same reference numerals.

Figure 2:
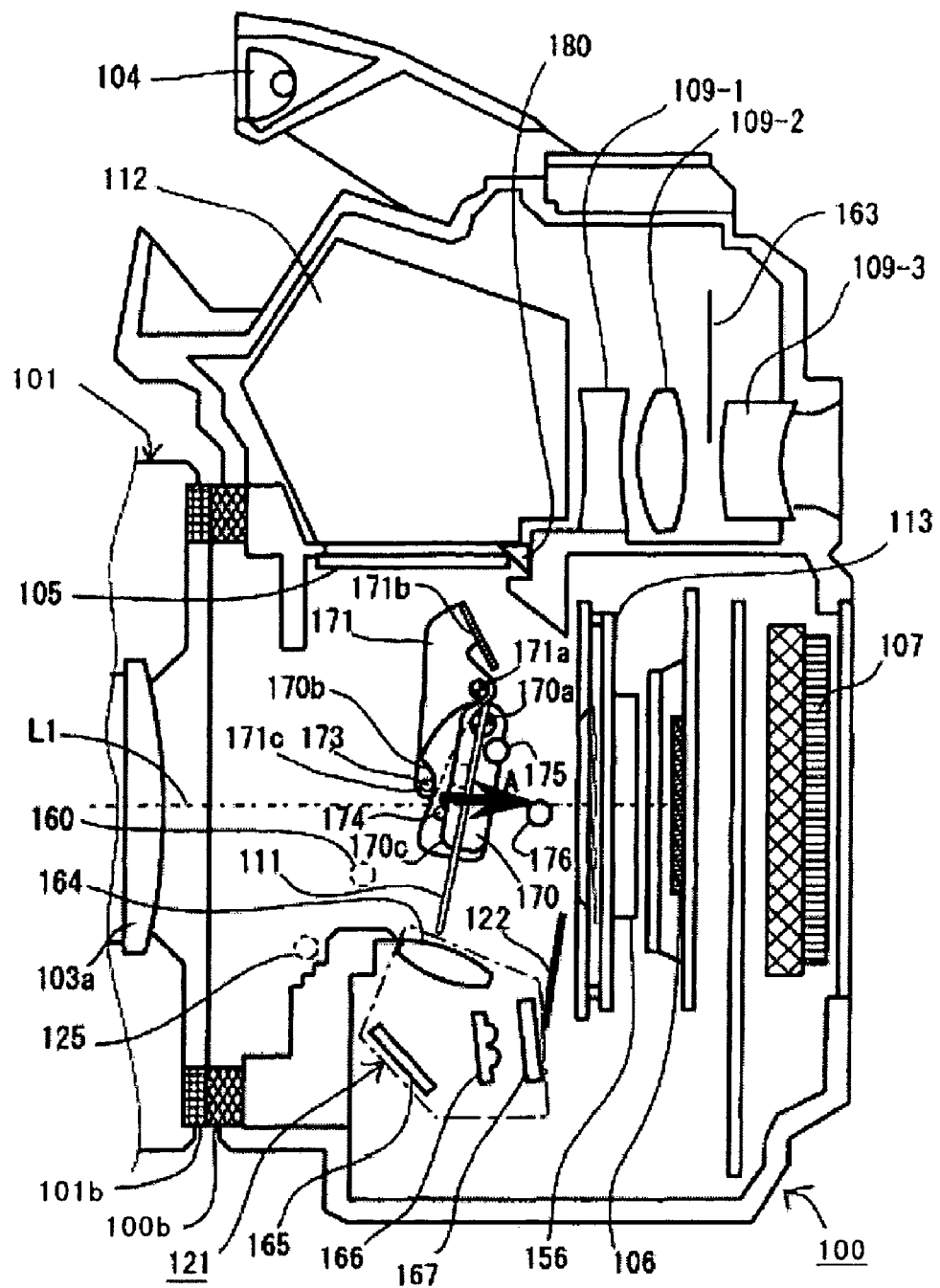
FIG. 2 is a sectional view of the camera system according to this embodiment, which is switching from a first optical path splitting state to a second optical path splitting state.
Figure 3:
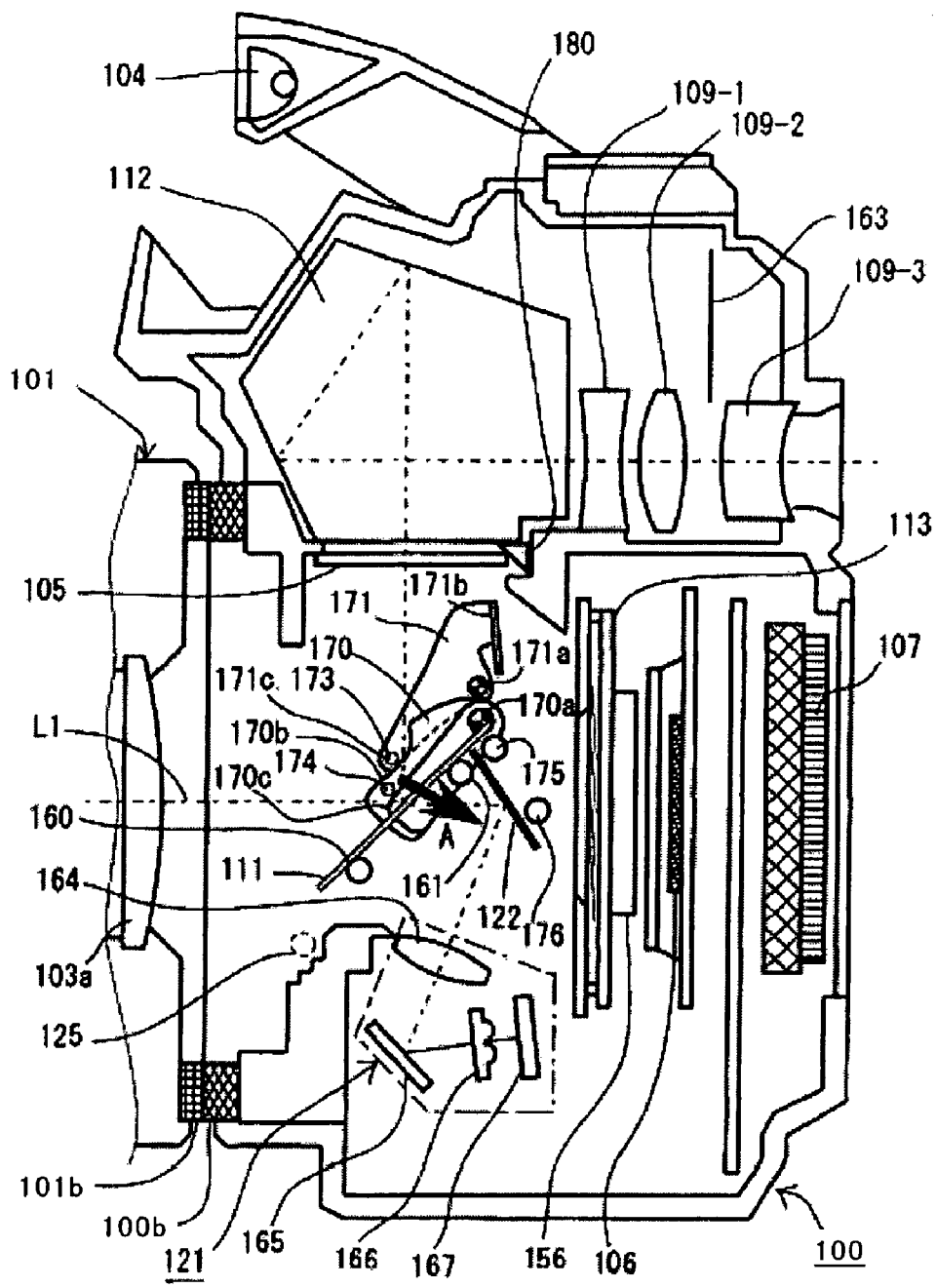
FIG. 3 is a sectional view of the camera system of one embodiment in the first optical path splitting state.

FIG. 1 is a sectional view of the camera system in the second optical path splitting state. FIG. 2 is a sectional view of the camera system that is switching from the first optical path splitting state to the second optical path splitting state. FIG. 3 is a sectional view of the camera system in the first optical path splitting state. FIG. 4 is a sectional view of the camera system that is switching from the first optical path splitting state to the third optical path splitting state. FIG. 5 is a sectional view of the camera system in the third optical path splitting state.

Referring now to FIG. 3, a description will be given of the configuration of the camera system when the optical path splitting system as the mirror unit that includes the half mirror 111 and sub-mirror 122 is in the above first optical path splitting state.

In FIG. 3, 100 denotes a camera body, and 101 denotes a lens unit. The lens unit 101 is attached to a camera mount 100b via a lens mount 101b. 103a denotes an image-taking lens closest to the image surface among plural lenses in the image-taking optical system 103. 105 denotes a focusing screen in the viewfinder optical system. 107 denotes a display unit. 163 denotes an eyepiece shutter.

164 denotes a condenser lens as a light receiving window in the focus detecting unit 121. 165 denotes a mirror that reflects the light from the condenser lens 164. 166 denotes a re-imaging lens for imaging the light reflected on the mirror 165 onto the focus detecting sensor 122. 122 denotes a focus detecting sensor.

111 denotes a movable half mirror that is held on a half-mirror receiving plate (not shown). Pins 173 are provided at both side edges of the half-mirror receiving plate in the direction perpendicular to the paper. A pin 174 is provided at one side edge in the direction perpendicular to the paper. The half mirror 111 and pins 173 and 174 move together.

170 denotes a half-mirror driving lever, and 171 denotes a half-mirror support arm. The half-mirror driving lever 170 is rotatably supported around a rotating shaft 170a that is fixed on the camera body 100, and the half-mirror support arm 171 is rotatably supported around the rotating shaft 171a that is fixed on the camera body 100.

The half-mirror support arm 171 is connected to an approximately similarly shaped structure provided at the wall surface side opposing to the mirror box via a connector 171b. The pins 173 at both sides of the half-mirror receiving plate (not shown) are engaged with the perforation holes 171c at the top of the half-mirror support arm 171. Thereby, the half mirror 111 is rotatable around the perforation hole 171c via the half-mirror receiving plate.

The half-mirror receiving plate is forced in the arrow A direction by a torsion spring (not shown) that is located in the middle of the pins 173 and 174, and the force of the torsion spring is also applied to the half mirror 111 via the half-mirror receiving plate.

In the first optical path splitting state, the mirror stoppers 160 and 161 project into the moving area of the half mirror 111, and contact the half mirror due to the force by the torsion spring. There are slight apertures between the pin 173 and a first cam surface 170b of the half-mirror driving lever 170, and between the pin 174 and a second cam surface 170b of the half-mirror driving lever 170. Thereby, the half mirror 111 is positioned as shown in FIG. 3.

The mirror stoppers 160 and 161 can project into and retreat from the moving area of the half mirror 111 due to driving of the mirror driving mechanism, not shown. The mirror stoppers 160 and 161 are located outside the image-taking optical path in place that does not affect the image-taking light, irrespective of whether or not they are located in the moving area of the half mirror 111. The following mirror stoppers 175 and 176 are similarly located outside the image-taking optical path.

The sub-mirror 122 is rotatable around the rotating shaft 125, and held at a position that reflects the transmission light from the half mirror 111 to the side of the focus detecting unit 121 or the condenser lens 164 as shown in FIG. 3 in the first optical path splitting state.

In the first optical path splitting state, part of the light from the image-taking optical system 103 is reflected on the half mirror 111 and introduced into the viewfinder optical system, and the rest of the light transmits through the half mirror 111, is reflected on the sub-mirror 122, and is introduced into the focus detecting unit 121.

When the mirror stoppers 160 and 161 shown in FIG. 3 retreat from the moving area of the half mirror 111, the half mirror 111 shifts to the state shown in FIG. 2 due to the force in the arrow A direction by the torsion spring (not shown). Due to the force by the torsion spring, the pin 173 contacts the first cam surface 170b of the half-mirror driving lever 170 and the pin 174 contacts the second cam surface 170c of the half-mirror driving lever 170.

The pins 173 and 174 slide along the first and second cam surfaces 170b and 170c as the half-mirror driving lever 170 rotates, and the orientation of the half mirror 111 changes: The half-mirror support arm 171 rotates as the the half-mirror driving lever 170 rotates, and the half-mirror receiving plate (not shown) and the half mirror 111 move together, which half-mirror receiving plate is connected to the half-mirror driving lever 170 and the half-mirror support arm 171 via the pins 173 and 174.

As the half-mirror driving lever 170 and the half-mirror support arm 171 rotate counterclockwise in FIG. 3, the half mirror 111 contacts the mirror stoppers 175 and 176 as shown in FIG. 1. Since the half mirror 111 receives the force in the arrow A direction from the torsion spring (not shown), it is held at the state shown in FIG. 1 or in the second optical path splitting state.

In shifting the half mirror 111 from the first optical path splitting state to the second optical path splitting state, the sub-mirror 122 rotates around the rotating shaft 125 clockwise in FIG. 3 and moves to the lower part of the mirror box: Before the half mirror 111 shifts from the first optical path splitting state to the second optical path splitting state, the sub-mirror 122 moves to the lower part of the mirror box, preventing the collision between the half mirror 111 and the sub-mirror 122.

In the second optical path splitting state, part of the light from the image-taking lens 103a is reflected on the half mirror 111 and introduced to the focus detecting unit 121 as shown in FIG. 1, and the rest of the light transmits the half mirror 111 and reaches the image-pickup device 106.

In shifting the first optical path splitting state (FIG. 3) to the third optical path splitting state (FIG. 5), the half-mirror driving lever 170 rotates clockwise in FIG. 3 and retreats the half mirror 111 from the image-taking optical path to the upper part in the camera body 100 (towards the focusing screen 105). As the sub-mirror 122 rotates around the rotating shaft 125 clockwise in FIG. 3, the sub-mirror 122 retreats from the image-taking optical path to the lower portion in the camera body 100.

In the third optical path splitting state, the light from the image-taking lens 103a reaches the image-pickup device 106 as shown in FIG. 5.

Figure 8A:
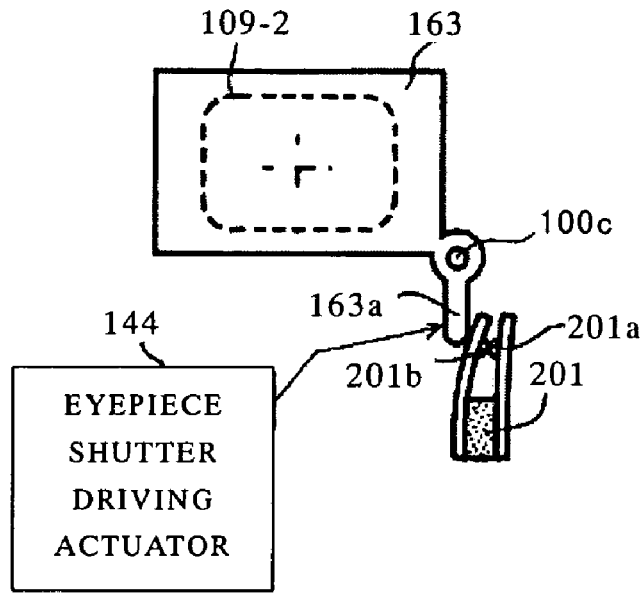
FIGS. 8A and 8B are figures showing the eyepiece shutter and the eyepiece shutter detector in the camera system of the embodiment.
Figure 8B:
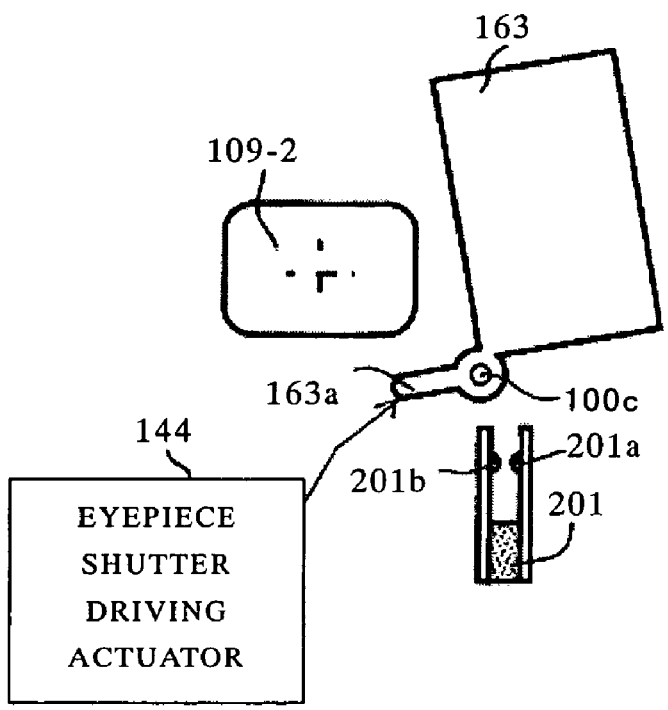

Next, the structures of the eyepiece shutter and eyepiece shutter detector will be explained using FIGS. 8A and 8B. FIGS. 8A and 8B show the structure of the eyepiece shutter and eyepiece shutter detector when viewed from light-emerging side (side of the photographer's eyeball) in FIG. 1. In FIGS. 8A and 8B, the exterior member of the camera body 100 and the viewfinder lens 109-3 are omitted to understand the movement of the eyepiece shutter 163 and eyepiece shutter detector 201 easily.

FIG. 8A shows a state in which the eyepiece shutter 163 has been moved into the optical path of the viewfinder optical system, and FIG. 8B shows a state in which the eyepiece shutter 163 has been moved out of the optical path.

The eyepiece shutter 163 is rotatable around a rotation axis 100c provided on the camera body 100 between a closing position where it has been moved into the optical path of the viewfinder optical system and an opening position where it has been moved out of the optical path.

The eyepiece shutter 163 includes the eyepiece shutter driving actuator 144, shown in FIG. 7, which drives the eyepiece shutter 163 according to a signal from the camera system controller 135.

A protrusion 163a is formed on the eyepiece shutter 163. The protrusion 163a is linked to the eyepiece shutter driving actuator 144 via a power transmission mechanism. Therefore, the eyepiece shutter driving actuator 144 rotates the eyepiece shutter 163 around the rotation axis 100c via the protrusion 163a.

The eyepiece shutter detector 201 is arranged in the vicinity of the protrusion 163a. The eyepiece shutter detector 201 has two terminals 201a and 201b. As shown in FIG. 8B, these two terminals 201a and 201b in a free state are separated to be in a no contact state (OFF state). As shown in FIG. 8A, these two terminals 201a and 201b are in contact with each other to be in a conductive state (ON state) when the end of the eyepiece shutter detector 201 has been pushed by the eyepiece shutter 163.

The eyepiece shutter detector 201 is connected to the camera system controller 135 as shown in FIG. 7. The camera system controller 135 judges the operating state of the eyepiece shutter 163 based on an ON signal or OFF signal from the eyepiece shutter detector 201.

When the eyepiece shutter switch 123 is moved to the close-side position by a photographer's operation, the operation detecting circuit 136 detects the operating state of the eyepiece shutter switch 123, and sends a detection signal to the camera system controller 135. The camera system controller 135 sends a drive signal to the eyepiece shutter driver 143 to drive the eyepiece shutter driving actuator 144. Thereby, the eyepiece shutter 163 is moved into the optical path of the viewfinder optical system (the close state) by receiving the driving power from the eyepiece shutter driving actuator 144.

When the eyepiece shutter 163 is driven to the close state, the protrusion 163a of the eyepiece shutter 163 pushes the end of the eyepiece shutter detector 201 as shown in FIG. 8A. Thereby, the eyepiece shutter detector 201 changes to the conductive state in which the terminal 201b contacts the terminal 201a, and then the camera system controller 135 detects that the eyepiece shutter 163 is in the close state.

On the other hand, when the eyepiece shutter switch 123 is moved to the open-side position by a photographer's operation, the operation detecting circuit 136 detects the operating state of the eyepiece shutter switch 123, and sends a detection signal to the camera system controller 135. The camera system controller 135 sends a drive signal to the eyepiece shutter driver 143 to drive the eyepiece shutter driving actuator 144. Thereby, the eyepiece shutter 163 is moved out of the optical path of the viewfinder optical system (the open state) by receiving the driving power from the eyepiece shutter driving actuator 144.

When the eyepiece shutter 163 is moved into the open state, the protrusion 163a of the eyepiece shutter 163 separates from the end of the eyepiece shutter detector 201 as shown in FIG. 8B. Thereby, the eyepiece shutter detector 201 changes to the nonconductive state, and then the camera system controller 135 detects that the eyepiece shutter 163 is in the open state.

Figure 9:
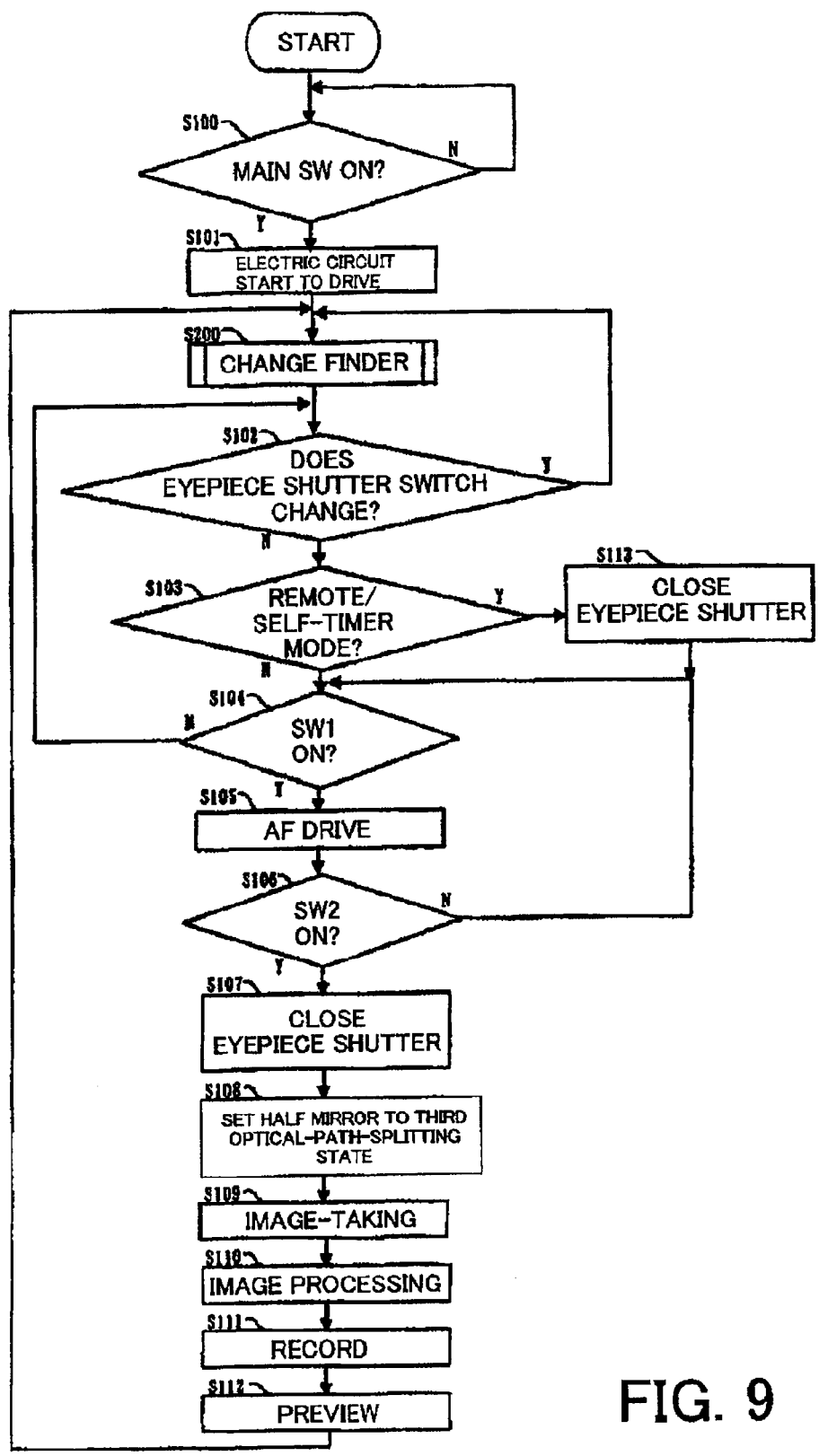
FIG. 9 is a flowchart showing the image-taking operation of the camera system of the embodiment.

Herein, as described later, the eyepiece shutter 163 is moved into the close state in the second and third optical path splitting states, as shown in FIG. 8A, and the eyepiece shutter 163 is moved into the open state in the first optical path splitting state, as shown in FIG. 8B The explanation of the image-taking sequence in the camera system having the above-described structure will be given using FIG. 9. The operation shown in FIG. 9 is performed by the camera system controller 135.

In Step S100, the camera system controller 135 judges whether the main switch 119 is in the ON state or not. When the main switch 119 is in the ON state, the process progresses to Step S101. In Step S101, the camera system controller 135 starts the operation of the electric circuit in the camera system. In Step S200, the camera system controller 135 executes a viewfinder switching subroutine that will be described later.

In Step S102, the camera system controller 135 judges whether the eyepiece shutter switch 123 has been operated or not through the operation detecting circuit 136. When the eyepiece shutter switch 123 has been operated, the process returns to Step S200 to perform the viewfinder changing operation. On the other side, when the eyepiece shutter switch 123 has not been operated, the process progresses to Step S103.

In Step S103, the camera system controller 135 judges whether one of the remote image-taking mode and the self-timer image-taking mode has been set by a remote mode setting switch or self-timer setting switch provided on the camera body 100, not shown in the figure, or not.

In the remote image-taking mode, an image-taking preparation operation and the image-taking operation are performed according to the operation of a remote control device. In the self-timer image-taking mode, the image-taking operation is performed after a predetermined time from a full-push operation of the release button 120. These image-taking modes are used, for instance, when the photographer wants to become the subject.

In Step S103, when the camera system controller 135 judges that the remote image-taking mode or the self-timer image-taking mode is set, the process progresses to Step S113.

In Step S113, the camera system controller 135 sends the drive signal to the eyepiece shutter driver 143 to drive the eyepiece shutter driving actuator 144. Thereby, the eyepiece shutter 163 is driven to the close state. When the eyepiece shutter 163 has been driven to the close state, the eyepiece shutter detector 201 sends a close-detection signal to the camera system controller 135; the camera system controller 135 confirms that the eyepiece shutter 163 is in the close state.

Since the photographer does not see into the viewfinder optical system in the remote image-taking and the self-timer image-taking, the inversely-entering light (outside light entering the viewfinder optical system from its eyepiece) enters the camera body 100 easily. The inversely-entering light reaching the focus detection unit 121 causes focus detection errors and disturbs accurate focus detection. Moreover, the inversely-entering light reaching the photometry system that is constituted by the image-pickup device 106 in the embodiment causes photometry detection errors.

Therefore, in Step S113, the accurate focus detection and photometry can be achieved by closing the eyepiece shutter 163 for blocking the inversely-entering light.

When the camera system controller 135 judges that the remote image-taking mode and the self-timer image-taking mode are not set in Step S103, the process progresses to Step S104.

In Step S104, the camera system controller 135 judges whether the SW1 is ON by a halfway push operation of the release button 120 or not. When the SW1 is OFF, the process returns to Step S102, and the camera system controller 135 judges whether the eyepiece shutter switch 123 has been operated or not. When the SW1 is ON, the process progresses to Step S105.

In Step S105, the camera system controller 135 sends an AF start signal to the AF controller 140. The AF controller 140 makes the focus detection unit 121 start the detection operation, and starts the focusing operation based on the output from the focus detection unit 121 (focus detection result).

In Step S106, the camera system controller 135 judges whether the SW2 is ON by a full push operation of the release button 120 or not. When the SW2 is OFF, the process returns to Step S104 again, and the camera system controller 135 judges whether the SW1 is ON or not. When the SW2 is ON, the process progresses to Step S107.

In Step S107, the camera system controller 135 sends the drive signal to the eyepiece shutter driver 143 to drive the eyepiece shutter driving actuator 144. Thereby, the eyepiece shutter 163 is driven to the close state. When the eyepiece shutter 163 has closed in Step S113, the camera system controller 135 does not perform the operation in Step S107.

When the eyepiece shutter 163 has been driven to the close state, the eyepiece shutter detector 201 sends the close-detection signal to the camera system controller 135; the camera system controller 135 confirms that the eyepiece shutter 163 is in the close state.

In Step S108, the camera system controller 135 sends a mirror drive start signal to the mirror driving controller 145 to drive the half mirror 111 and sub mirror 122 to the position of the third optical path splitting state, shown in FIG. 5. In the third optical path splitting state, since the half mirror 111 and sub mirror 122 are located out of the image-taking optical path, the light flux from the image-taking lens 103a reaches the image-pickup device 106 directly.

In Step S109, the camera system controller 135 controls the drive of the diaphragm, not shown in the figure, provided in the lens apparatus 102 through the lens system controller 141. Specifically, the camera system controller 135 controls the drive of the diaphragm so that its aperture value may become a value that has determined based on the result of the photometry. In addition, the camera system controller 135 controls the drive of the focal plane shutter 113 according to need. Specifically, the camera system controller 135 controls the drive of the focal plane shutter 113 so that its shutter speed may become a speed that has determined based on the result of the photometry. Thereby, object light having an adequate light amount passes the image-taking optical system 103 and forms an image on the light-receiving surface of the image-pickup device 106.

Then, the camera system controller 135 sends an image-taking start signal to the image-pickup device drive circuit 137 to drive the image-pickup device 106. Thereby, the image-pickup device 106 accumulates electrical charge according to the amount of light received, and then the electrical charge (signal) is read out. This is the image-taking operation.

In Step S110, the signal read out from the image-pickup device 106 is sent to the RGB image processor 131 via the A/D converter 130. The RGB image processor 131 gives white balance processing, gamma correction processing and interpolation calculation processing to the signal. Moreover, the YC processor 132 gives YC processing to the signal, and then the image processing is finished. This image processing can generate a high definition image.

In Step S111, the image data is sent to the record processor 133. The record processor 133 compresses the data in a predetermined compression format, and then records it to a recording medium.

In Step S112, the image data is sent to the playback processor 134. The playback processor 134 previews a taken image on the display unit 107. The process progresses returns the viewfinder switching subroutine (Step S200) after previewing, and then the camera system controller 135 changes the optical path splitting state according to the operation state of the eyepiece shutter switch 123.

In the above-mentioned flowchart, when the remote image-taking mode and self-timer image-taking mode are set, and when the mirror unit as the optical path splitting system is set to the third optical path splitting state, the eyepiece shutter 163 is closed. Thereby, the inversely-entering light is blocked so as no to enter the camera body 100.

Herein, in the third optical path splitting state, the half mirror 111 transmitting light is arranged below the focusing screen 105. Therefore, the inversely-entering light may be transmitted through the viewfinder optical system and half mirror 111, and reaches the image-pickup device 106. Thus, in the embodiment, when the mirror unit is set to the third optical path splitting state, the eyepiece shutter 163 is closed so that the inversely-entering light may not reach the light-receiving surface of the image-pickup device 106.

Furthermore, in the embodiment, the eyepiece shutter 163 is automatically driven to the close state according to setting of the remote image-taking mode, the self-timer image-taking mode, and the third optical path splitting state. Thereby, it is possible to improve usability of the camera as compared with a case where the eyepiece shutter is closed manually.

Next, the viewfinder switching subroutine (Step S200) will be explained using FIG. 10.

In Step S201, the camera system controller 135 judges the operation state (the close-side position or the open-side position) of the eyepiece shutter switch 123 through the operation detecting circuit 136. When the eyepiece shutter switch 123 is in the close-side position, the process progresses to Step S202. At this time, the camera system controller 135 performs the operations in Steps S202 to S210 for setting the EVF mode, shown in FIG. 1.

The photographer that moves the eyepiece shutter switch 123 to the open-side position has no intention to use the viewfinder optical system, and desires to take images while seeing images displayed on the display unit 107. Thus, changing to the EVF mode in the case where the eyepiece shutter switch 123 is in the close-side position responds adequately to the photographer's intention.

In Step S202, the camera system controller 135 sends the drive signal to the eyepiece shutter driver 143 to drive the eyepiece shutter driving actuator 144. Thereby, the eyepiece shutter 163 is driven to the close state. When the eyepiece shutter 163 has been driven to the close state, the eyepiece shutter detector 201 sends the close-detection signal to the camera system controller 135; the camera system controller 135 confirms that the eyepiece shutter 163 is surely in the close state.

In Step S203, the display in the optical viewfinder field is turned off by stopping the drive of the display unit 180 in the viewfinder optical system. Turning off the display in the optical viewfinder field when the eyepiece shutter 163 is in the close state can reduce power consumption of the camera body 100 and suppress battery drain.

In Step S204, the sub mirror 122 arranged on the image-taking optical path is rotated to a position below the mirror box in preparation for the movement of the half mirror 111 from the first optical path splitting state to the second optical path splitting state.

In Step S205, the mirror stoppers 160 and 161 are retreated from the movement region of the half mirror 111. After the movement of the mirror stoppers 160 and 161, in Step S206, the half mirror driving lever 170 is rotated in the counter-clockwise direction in FIG. 3. Thereby, the half mirror 111 is driven to the second optical path splitting state shown in FIG. 1 through the state shown in FIG. 2 by the biasing power of a spring (not shown in the figure) in the mirror driving mechanism. The half mirror 111 that is in the second optical path splitting state reflects the light flux from the image-taking lens 103 and leads it to the focus detection unit 121.

In the second optical path splitting state, a certain gap is formed between the pin 173 and the first cam surface 170b of the half mirror driving lever 170 and between the pin 174 and the second cam surface 170c of the half mirror driving lever 170, respectively, and the half mirror 111 is positioned by the contact with the mirror stoppers 175 and 176. The mirror stoppers 175 and 176 are arranged so that the position of the reflection surface of the half mirror 111 in the second optical path splitting state may become congruent with the position of the reflection surface of the sub mirror 122 in the first optical path splitting state.

By the above described structure, it is possible to prevent the incidence position of light to the focus detection unit 121 from shifting between the OVF mode and the EVF mode, and to make the focus detection unit 121 perform its detection operation accurately.

In the second optical path splitting state, the light from the image-taking lens 103a transmits through and refracts in the half mirror 111, and then reaches the image-pickup device 106. A focus position of the object image on the image-pickup device 106 formed by the light that has transmitted through the half mirror 111 slightly offsets from the position on the image-pickup device 106 to which the light reaches without transmitting the half mirror 111.

Therefore, step S207 runs a focus correction mode and corrects the above offset of the focus position.

In this embodiment, a focus detecting signal output from the focus detecting unit 121 in the first optical path splitting state indicates a focus position when the light from the image-taking lens 103a directly reaches the image-pickup device 106 in the third optical path splitting state. On the other hand, when the focus correction mode is set in the second optical path splitting state, the above focus detecting signal is corrected so as to indicate focus of the light from the image-taking lens 103a which transmits through the half mirror 111 and reaches the image-pickup device 106. Therefore, the focus position of the focus lens 103b in the image-taking optical system 103 in the second optical path splitting state offsets by a correction amount of the focus detecting signal from the focus position in the first and third optical path splitting states.

Therefore, in image-taking by turning on SW2 in the EVF mode, or in switching the optical path splitting system from the second optical path splitting state to the third optical path splitting state, a front curtain driving mechanism of the focal plane shutter 113 is charged and the position of the focus lens 103b is corrected by the above offset amount: The focus lens 103b moves from the focus position in the second optical path splitting state to the focus position of the third optical path splitting state. Then, the focal plane shutter 113 opens for a predetermined time period for image-taking by the image-pickup device 106.

The above configuration enables a focused image to be confirmed on the display unit 107 in the EVF mode (or in the second optical path splitting state), and a focused image to be captured even in image-taking in the third optical path splitting state.

In Step S208, the front curtain of the focal plane shutter 113 is preceded for the bulb exposure, allowing the object light that has transmitted the image-taking optical system 103 to continuously reach the image-pickup device 106 and the image to be displayed on the display unit 107.

In Step S209, the display unit 107 is powered on. In Step S210, the image-pickup device 106 performs continuously its image-pickup operation of the object image that is formed by the image-taking optical system 103 continues, and the image data read from the image-pickup device 106 and processed is displayed on the display unit 107 on a real-time basis. This is an end of a switching operation from the OVF mode to the EVF mode.

Figure 13:
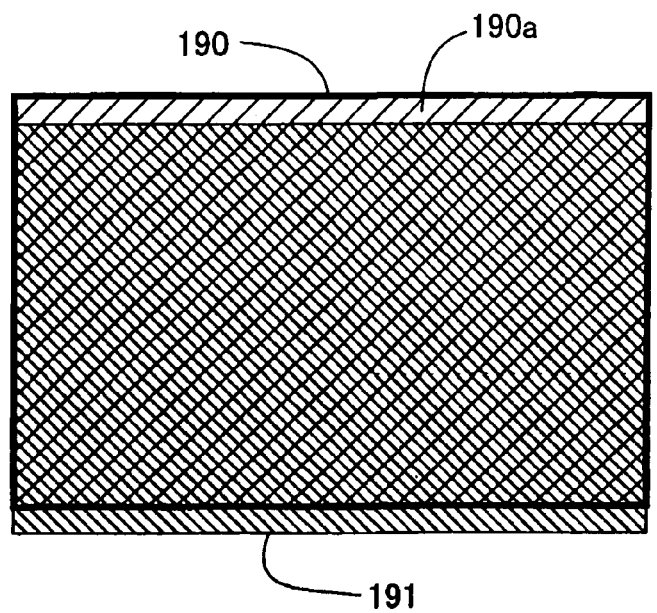
FIG. 13 is a view showing a relationship between an image-pickup range and an image range which can be output to a display unit.

In the second optical path splitting state or the EVF mode, the light from the image-taking lens 103a refracts in the half mirror 111 and reaches the image-pickup device 106. Therefore, as shown in FIG. 13, the light receiving area 190 of the image-pickup device 106 in the second optical path splitting state may slightly offset from the light receiving area of the image-pickup device 106 in the third optical path splitting state in the longitudinal direction of the image-pickup device 106 in FIG. 1. In other words, the real-time displayed image on the display unit in the second optical path splitting state may not accord with the image captured in the third optical path splitting state.

An area 190a that does not overlap an area 191 in the area 190 is displayed on a real-time basis on the display unit 107, but is not included in an area shot in the third optical path splitting state.

Figure 14:
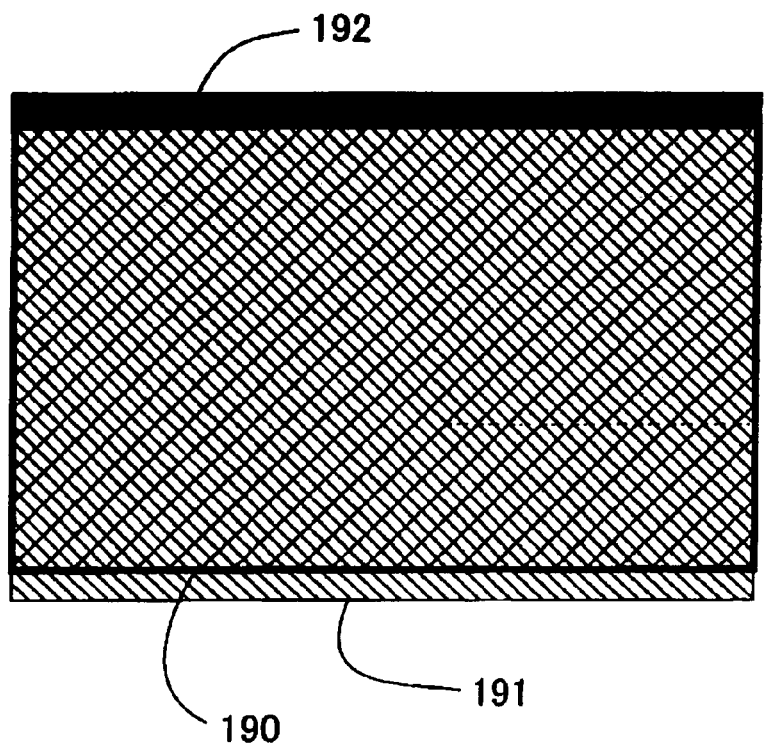
FIG. 14 is a view showing a relationship between an image-pickup range and an image range which can be output to a display unit.

The camera of this embodiment blacks out the area 192 corresponding to the area 190a in the image area displayed on the display unit 107 on a real-time basis (FIG. 13) as shown in FIG. 14, and prevents a display of the entire area 190. The playback processor 134 handles this process.

This configuration prevents a problem in that actually shot images include an image that is not displayed on the display unit 107 on a real-time basis.

Next, the operation in a case where it is judged that the eyepiece shutter switch 123 is set to the open-side position in Step S201 in FIG. 10 will be explained. In other words, the operation at the time of change from the EVF mode to the OVF mode will be explained.

When the eyepiece shutter switch 123 is set to the open-side position, the camera system controller 135 judges that the OVF mode is set, and performs the following operation for setting the camera to a state according to the OVF mode.

Opening the eyepiece shutter 163 means that the photographer wants to use the optical viewfinder. Therefore, changing to the OVF mode according to the detection of the open-side position in the eyepiece shutter switch 123 can respond adequately to the photographer's intention.

In Step S220, driving of the display unit 107 and image-pickup operation by the image-pickup device 106 are stopped.

In Step S221, a back curtain of the focal plane shutter 113 runs, thus the shutter is closed. Moreover, in Step S221, the front and back curtain driving mechanisms are charged for an image-taking preparation. In Step S213, the mirror stoppers 160 and 161 are retread from the moving area of the half mirror 111, and thereby allowing a movement of the half mirror 111 in the subsequent steps.

In Step S223, the half-mirror driving lever 170 is rotated clockwise in FIG. 1 and only the half mirror 111 is transferred in order of the state shown in FIG. 2, the state shown in FIG. 3, the state shown in FIG. 4, and the state shown in FIG. 5. The half mirror 111 shifts to the third optical path splitting state (FIG. 5) via the first optical path splitting state (FIG. 3).

In Step S224, the mirror stoppers 160 and 161 are moved in the moving area of the half mirror 111, and the half mirror 111 moves to a predetermined location for positioning.

As described above, the half mirror 111 is shifted to the third optical path splitting state after the mirror stoppers 160 and 161 are retreated from the moving area of the half mirror 111, and then the mirror stoppers 160 and 161 are moved in the moving area of the half mirror 111. Therefore, the half mirror 111 does not collide with the mirror stopper 160 and 161, and the mechanical reliability improves in switching the OFV mode to the EVF mode.

In Step S225, the half-mirror driving lever 170 is rotated counterclockwise in FIG. 5, and the half mirror 111 is turned from the third optical path splitting state (FIG. 5) to the first optical path splitting state (FIG. 3) via the state shown in FIG. 4. Here, the half mirror 111 receives the force of a spring (not shown) in the mirror driving mechanism 150, and contacts the mirror stoppers 160 and 161.

In Step S226, the camera system controller 135 drives the eyepiece shutter 163 to the open state via the eyepiece shutter driver 143 and the eyepiece shutter driving actuator 144. When the eyepiece shutter 163 has been driven to the open state, the eyepiece shutter detector 201 shown in FIG. 8B sends the open-detection signal to the camera system controller 135; the camera system controller 135 confirms that the eyepiece shutter 163 is surely in the open state.

In Step S227, the camera system controller 135 judges whether a manual focus mode is set or not based on the operation state of an AF/MF switch, not shown in the figure, provided in the camera system. If the manual focus mode is set, the process progresses to Step S205. If the manual focus mode is not set but the auto focus mode is set, the process progresses to Step S228.

When the manual focus mode is set, the operation of the focus detection unit 121 is not needed. In addition, the photographer can see the degree of blurring in a background (object image) more accurately using the EVF than using the OVF. Therefore, when the manual focus mode is set, the process progresses to Step S205 for performing real-time display by the display unit 107.

In Step S205, the eyepiece shutter 163 is driven to the close state. Thereby, it becomes possible to prioritize observation of the object by the EVF, and to suppress disadvantageous effects of the inversely-entering light from the viewfinder optical system on the real-time displayed image.

In Step S228, the sub-mirror 122 is moved into the image-taking optical path at a predetermined position to introduce to the focus detecting unit 121 the object light that has transmitted through the half mirror 111. During the processes from step S220 to S227, the sub-mirror 122 is located at a position of the second optical path splitting state (FIG. 1) or a position that retreats from the image-taking optical path, and operates when the flow proceeds to step S228.

In step S229, the camera system controller 135 drives the OVF information display unit 180, and activates the information display function in the viewfinder. This is an end of a switch from the EVF mode to the OVF mode.

This embodiment sets the second optical path splitting state (FIG. 1) to the optical path splitting system that includes the half mirror 111 and the sub-mirror 122 in displaying a shot image on the display unit 107 or in the EVF mode, and introduces the light from the image-taking lens 103a to the focus detecting unit 121. This accelerates focusing in the EVF mode by the phase difference detection method at the focus detecting unit 121.

When the photographer uses the viewfinder optical system for image-taking, he/she is sure to operate the eyepiece shutter switch 123 to the open-side position so as to set the eyepiece shutter 163 to the open state. Thus, setting the eyepiece shutter switch 123 to the open-side position reflects the photographer's intention to use the OVF. Therefore, setting the OVF mode according to the intention is reasonable.

Operating the eyepiece shutter switch 123 to the close-side position means that the photographer has no intention to use the optical viewfinder. Thus, setting the eyepiece shutter switch 123 to the close-side position reflects the photographer's intention to use the EVF. Therefore, setting the OVF mode according to the intention is reasonable.

As described above, it is possible to respond adequately to the photographer's intention by changing between the OVF mode and the EVF mode according to the state (close-side position or open-side position) of the eyepiece shutter switch 123.

A description will now be given of signal processing for a focus detection by the focus detecting unit 121.

The (object) light emitted from the image-taking lens 103a is reflected on the half mirror 111 in the second optical path splitting state, and on the sub-mirror 122 on the first optical path splitting state, and then enters the condenser lens 164 provided at the lower portion of the mirror box. The light incident upon the condenser lens 164 deflects on the mirror 165, and forms a secondary image of the object on the focus detecting sensor 167 by an operation of a re-imaging lens 166.

The focus detecting sensor 167 has at least two pixel columns. A relative lateral shift is seen between signal waveform outputs from the two pixel columns in accordance with the imaging state on the focus detecting area of the object image that is formed by the image-taking optical system 103. A shift direction of the output signal waveform inverts depending upon whether the imaging state is a front focus or a back focus. It is the principle of focus detection to detect a shift direction and a shift amount (or a phase difference) using such an approach as the correlation operation.

Figure 11:
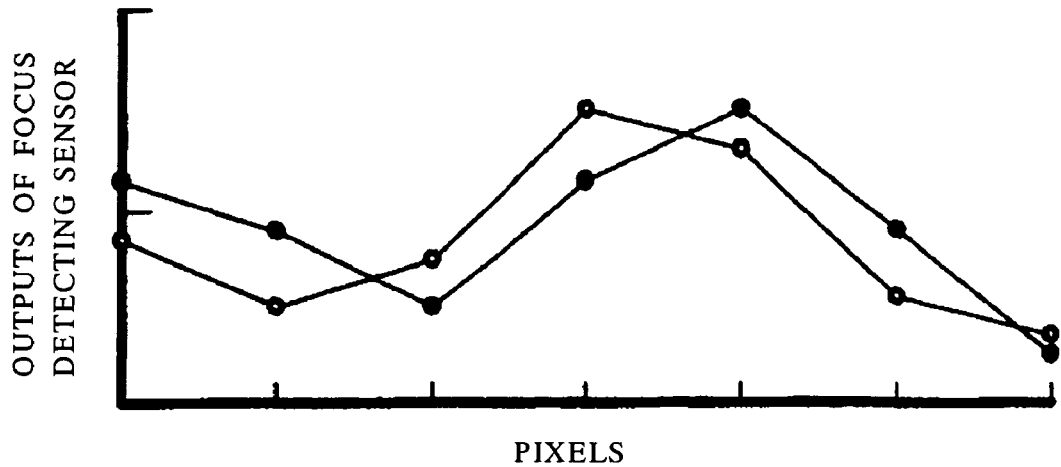
FIG. 11 is a view showing an output signal waveform of a focus detecting sensor when the image-taking optical system is an out-of-focus state.
Figure 12:
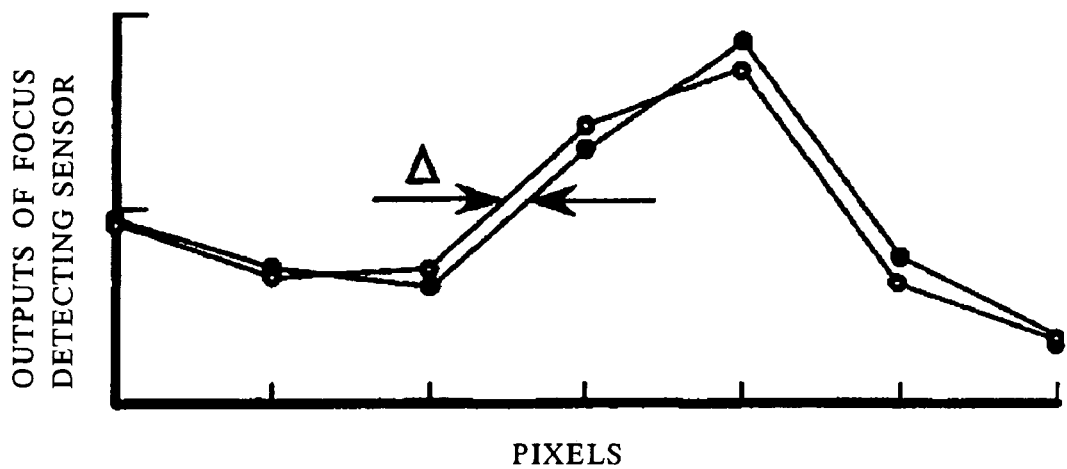
FIG. 12 is a view showing an output signal waveform of a focus detecting sensor when the image-taking optical system is an in-focus.

FIGS. 11 and 12 show output signal waveforms of focus detecting sensor 167 input to the AF controller 140. The abscissa axis indicates a pixel arrangement, and the ordinate axis indicates an output value of the focus detecting sensor 167. FIG. 11 shows an output signal waveform at a defocus state from the object image. FIG. 12 shows an output signal waveform at a focus state from the object image.

In general, the light used for focus detection is not the same as the imaging light in the stop opening state but part of the imaging light. In other words, the focus detection uses dark F-number light. When a mechanical error in the camera is considered, a position of the image-pickup device 106 and a position of the focus detecting sensor 167 are not, strictly speaking, optically conjugate with each other.

Therefore, even in the focus state on the object image, as shown in FIG. 12, there is a slight initial phase difference $\Delta$ between two output signal waveforms. This slight initial phase difference $\Delta$ is different from that used for correction to a focus detection signal in the above focus correction mode (see step S207 in FIG. 10).

Since a true phase difference is given by subtracting the initial phase difference $\Delta$ a phase difference detected through a correlation operation of two images, the initial phase difference $\Delta$ itself does not usually pose a problem.

As described above, the sub-mirror 122 in the first optical path splitting state or the half mirror 111 in the second optical path splitting state can introduce the light used for the focus detection in this embodiment. However, the reflection surface position of the sub-mirror 122 in the first optical path splitting state (FIG. 3) does not completely accord with the reflection surface position of the half mirror 111 in the second optical path splitting state (FIG. 1) in view of the mechanical accuracy, and different optical path splitting states have different values of the initial phase difference $\Delta$. Thus, the true phase differences in the first and second optical path splitting states cannot be given merely by subtracting a constant initial phase difference $\Delta$ from the phase difference detected through the correlation operation.

The usual component processing accuracy may offset two reflection positions from each other by about 30 μm in the perpendicular direction of the reflection surface. An attempt to reduce the mechanical offset on the reflection surface position would remarkably increase the component processing cost.

Accordingly, this embodiment sets the initial phase differences $\Delta$ for the first and second optical path splitting states, respectively, and uses the initial phase difference $\Delta$ corresponding to the selected optical path splitting state so as to correct the output signal of the focus detecting sensor 167. Thereby, a true phase difference corresponding to the selected optical path splitting state can be obtained, and precise focus detections are available based on the phase difference.

Thus, whether or not the image-taking optical system is in the in-focus state can be determined by determining the identity of a pair of signals by considering the initial phase difference. The defocus amount can be calculated by detecting the phase difference using a known approach, such as an approach using the correlation operation disclosed, for example, in Japanese Patent Publication No. H05-88445. The obtained defocus amount is converted into the driving amount of the focus lens 103b in the image-taking optical system 103, and the focus lens 103b is driven by the driving amount for autofocus of the image-taking optical system.

The phase difference detection method uses a known driving amount of the focusing lens 103b, only one driving of the lens is usually enough to obtain the in-focus position, and can provide extremely high-speed focusing.

This embodiment achieves the focus detection in the phase difference detection method by the focus detecting unit 121 in the EVF mode where the display unit 107 displays the object image on the real-time basis, in addition to the OVF mode where the viewfinder optical system is used to observe the object image, accelerating the focusing of the image-taking optical system. When the continuous image-taking and motion-image-taking are available in the second optical path splitting state (FIG. 1), these image-takings can obtain high-speed focusing. This embodiment does not require the conventional two focus detecting units, and prevents a large size and increased cost of the camera system.

In the embodiment, the light flux from the image-taking lens 103a is led to the focus detection unit 121, and the focus detection unit 121 performs focus detection by the phase difference detection method in the second optical-path-splitting state shown in FIG. 1. However, focus detection can be performed based on an output from the image-pickup device 106 by the contrast detection method because the light flux from the image-taking lens 103a reaches the image-pickup device 106, too, in the second optical-path-splitting state. Performing the focus detection by the contrast detection method after driving the focus lens based on the focus detection result by the phase difference detection method can increase the accuracy of the drive of the focus lens to the in-focus position.

Herein, the focus detection by the contrast detection method is performed as follows. First, the sharpness of the object image formed by the image-taking optical system 103 is obtained by evaluating the output from the image-pickup device with a predetermined evaluation function. Next, the position of the focus lens on the optical axis is adjusted so that the function value (evaluation value) may become the maximum value.

The evaluation function includes a function in which the absolute values of luminance difference between adjacent pixels are added in the focus detection area, a function in which the square values of luminance difference between adjacent pixels are added in the focus detection area, and a function in which the above mentioned absolute values or square values are added in each image signal of R, G and B.

Furthermore, in the embodiment, since the viewfinder mode is automatically changed between the OVF mode (first optical-path-splitting state) and the EVF mode (second optical-path-splitting state) according to the operation position (open-side position and close-side position) of the eyepiece shutter switch 123, it is possible to improve the usability of the camera system. In addition, since the eyepiece shutter is closed in the EVF mode, it is possible to certainly prevent the inversely-entering light from entering the focus detection unit 121, and thereby increasing the focus detection accuracy by the focus detection unit 121 by the phase difference detection method.

Moreover, since the eyepiece shutter 163 is closed at the time of image-taking in the third optical-path-splitting state, the inversely-entering light from the viewfinder optical system is blocked. Therefore, it is possible to prevent disadvantageous effects of the inversely-entering light on the taken image. Thereby, it is possible to obtain images with high quality.

Furthermore, since the eyepiece shutter 163 is closed at the time of remote image-taking and self-timer image-taking, the inversely-entering light from the viewfinder optical system is blocked. Therefore, it is possible to increase the accuracy of focus detection by the phase difference detection method. Thereby, it is possible to obtain images with high quality.

In the embodiment, the eyepiece shutter 163 is opened and closed by the eyepiece shutter driving actuator 144 controlled by the camera system controller 135 via the eyepiece shutter driver 143. However, the eyepiece shutter 163 can be opened and closed by the manual operation by the photographer. In this case, for instance, a lever member linked to the eyepiece shutter 163 is provided in the camera, and the eyepiece shutter 163 can be opened and closed by operating the lever member.

Figure 10:
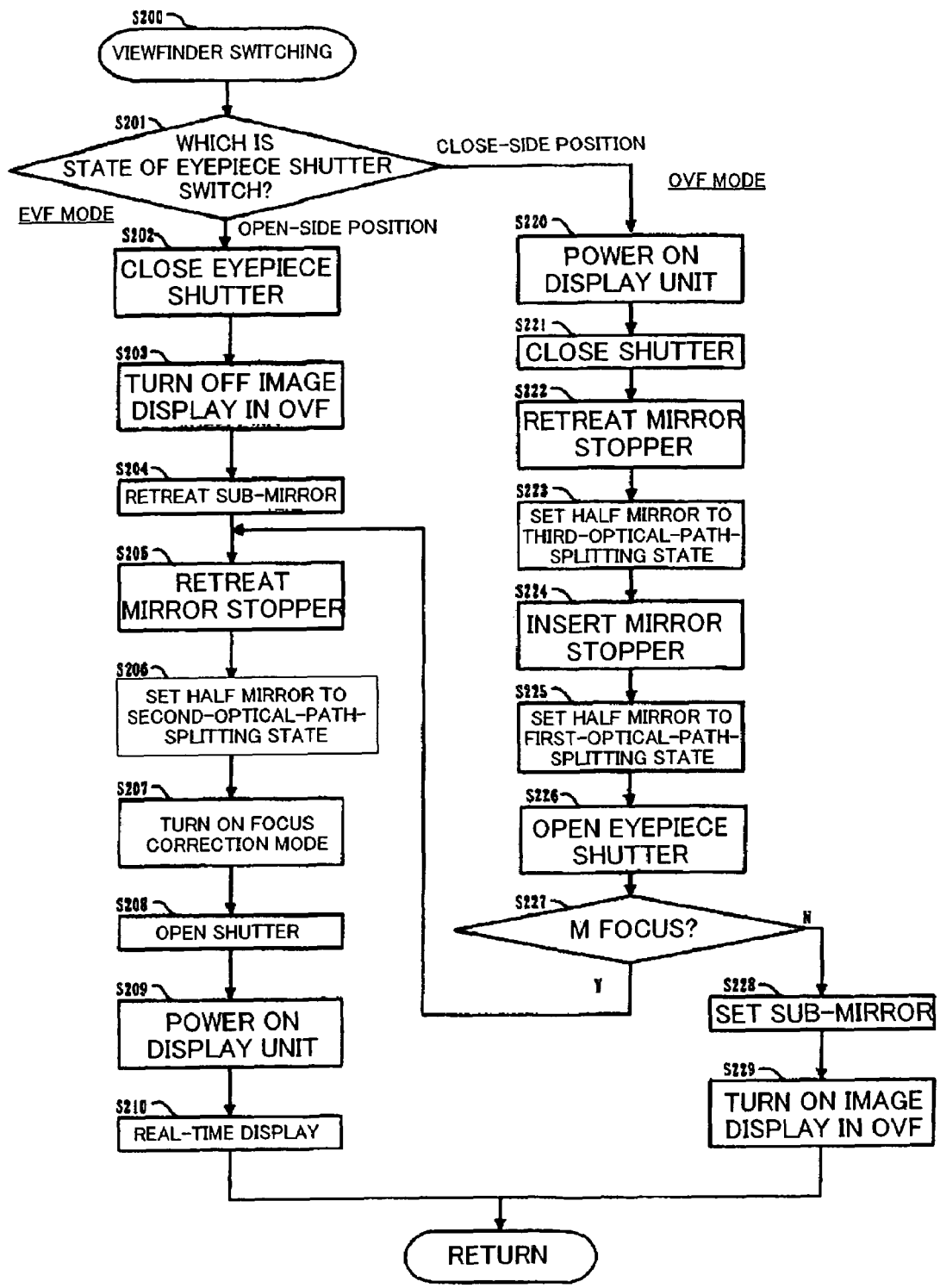
FIG. 10 is a flowchart showing the operation in the viewfinder-switching subroutine of the camera system of the embodiment.

In this case, the camera system controller 135 can detect the open/close state of the eyepiece shutter 163 based on the output from the eyepiece shutter detector 201, and perform the change operation, shown in FIG. 10, between the OVF mode and the EVF mode.

According to the present embodiment, it is possible to make the viewfinder shutter (eyepiece shutter) perform the opening and closing operation by only operating the operation member, and to drive the mirror unit to the optical-path-splitting states corresponding to the open and close states of the viewfinder shutter. Thereby, it is possible to improve the operationality (usability) of the image-taking apparatus. In other words, the control of the image-taking apparatus according to the photographer's intention can be achieved by an easier operation.

Moreover, when the mirror unit is driven to the second optical-path-splitting state, the viewfinder shutter is closed. Thereby, it is possible to block the outside light entering the image-taking apparatus trough the viewfinder optical system. On the other side, when the mirror unit is driven to the first optical-path-splitting state, the viewfinder shutter is opened. Thereby, it is possible to observe the object trough the viewfinder optical system.

This application claims foreign priority benefits based on Japanese Patent Application No. 2004-108512, filed on Mar. 31, 2004, which is hereby incorporated by reference herein in its entirety as if fully set forth herein.

What is claimed is:

1. An image-taking apparatus comprising:
   an image-pickup device, which performs photoelectrical conversion of an object image formed with a light flux from an image-taking lens;
   a viewfinder optical system, which is used for optical observation of the object image with the light flux;
   a focus detecting unit, which detects a focus state of the image-taking lens using the light flux;
   a mirror unit, which is switchable between a first state to introduce the light flux into the viewfinder optical system and the focus detecting unit, and a second state to introduce the light flux to the image-pickup device and the focus detecting unit;
   a viewfinder shutter, which opens and closes a viewfinder optical path of the viewfinder optical system;
   an operation member, which is operated to make the viewfinder shutter open and close; and
   a controller, which switches the mirror unit between the first state of the mirror unit and the second state of the mirror unit,
   wherein the controller switches the state of the mirror unit to the first state in accordance with an open-side-operation of the operation member, and switches the state of the mirror unit to the second state in accordance with a close-side-operation of the operation member.

2. The image-taking apparatus according to claim 1, further comprising an operation detector, which detects the operation of the operation member,
   wherein the controller switches the state of the mirror unit based on a signal from the operation detector.

3. The image-taking apparatus according to claim 1, further comprising a viewfinder shutter detector, which detects whether the viewfinder shutter is opened or closed,
   wherein the controller switches the state of the mirror unit based on a signal from the viewfinder shutter detector.

4. The image-taking apparatus according to claim 1,
   wherein in the first state the mirror unit reflects the light flux toward the viewfinder optical system and focus detection unit, and in the second state the mirror unit transmits the light flux toward the image-pickup device and reflects the light flux toward the focus detection unit.

5. The image-taking apparatus according to claim 1, wherein the mirror unit is constituted by a first mirror member reflecting a part of the light flux and transmitting another part of the light flux, and a second mirror member reflecting the other part of the light flux that has been transmitted through the first mirror member, and wherein the first and second members are arranged in an optical path of the light flux in the first state, the first member is arranged in the optical path and the second member is arranged out of the optical path in the second state, and the first and second members are arranged out of the optical path at the time of image-taking.

6. The image-taking apparatus according to claim 1, wherein the image-taking apparatus has a plurality of image-taking mode including a remote image-taking mode and a self-timer image-taking mode, and wherein the controller closes the viewfinder shutter when at least one of the remote image-taking mode and self-timer image-taking mode is set, irrespective of the operation of the operation member.

7. An image-taking system comprising:

the image-taking apparatus according to claim 1; and an image-taking lens, which is mounted on the image-taking apparatus.

* * * * *